US010554066B2

United States Patent
Huang et al.

(10) Patent No.: US 10,554,066 B2
(45) Date of Patent: Feb. 4, 2020

(54) ENERGY MANAGEMENT METHOD FOR A DEVICE WITH A RECHARGEABLE BATTERY

(71) Applicant: HUAWEI TECHNOLOGIES CO., LTD., Shenzhen, Guangdong (CN)

(72) Inventors: Kangmin Huang, Shenzhen (CN); Pinghua Wang, Shenzhen (CN); Maosheng Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 15/662,949

(22) Filed: Jul. 28, 2017

(65) Prior Publication Data

US 2017/0331301 A1 Nov. 16, 2017

Related U.S. Application Data

(63) Continuation of application No. PCT/CN2016/071571, filed on Jan. 21, 2016.

(30) Foreign Application Priority Data

Jan. 30, 2015 (CN) .......................... 2015 1 0052147

(51) Int. Cl.
*H01M 10/44* (2006.01)
*H01M 10/46* (2006.01)
(Continued)

(52) U.S. Cl.
CPC ............ *H02J 7/007* (2013.01); *H02J 7/0004* (2013.01); *H02J 7/0047* (2013.01);
(Continued)

(58) Field of Classification Search
CPC ........ H02J 7/007; H02J 7/0075; H02J 7/0021; H02J 7/0047; H02J 2007/005; H02J 7/0026
(Continued)

(56) References Cited

U.S. PATENT DOCUMENTS 6,323,775 B1 11/2001 Hansson
6,764,373 B1 7/2004 Osawa et al.
(Continued)

FOREIGN PATENT DOCUMENTS

CN 1377518 A 10/2002
CN 1585417 A 2/2005
(Continued)

OTHER PUBLICATIONS

Chinese Office Action dated Jan. 23, 2018 in corresponding Chinese Patent Application No. 201510052147.X, 8 pp.
(Continued)

*Primary Examiner* — Edward Tso
(74) *Attorney, Agent, or Firm* — Conley Rose, P.C.

(57) ABSTRACT

The present invention discloses an energy management method for a device including a rechargeable-battery. The energy management method includes: obtaining, by the device including a rechargeable-battery, information that is related to energy availability; analyzing, by the device including a rechargeable-battery according to the information that is related to energy availability, the energy availability of the device including a rechargeable-battery, and determining, according to an analysis result, an energy availability level of the device including a rechargeable-battery; generating, by the device including a rechargeable-battery, an energy management policy according to the energy availability level; and executing, by the device including a rechargeable-battery, the energy management
(Continued)

policy. The present invention further discloses a device including a rechargeable-battery. In the foregoing manners, the present invention can effectively improve a battery endurance capability and improve user experience.

27 Claims, 14 Drawing Sheets

(51) Int. Cl.
    *H02J 7/00*     (2006.01)
    *H02J 50/80*     (2016.01)

(52) U.S. Cl.
    CPC ............ *H02J 7/0063* (2013.01); *H02J 50/80* (2016.02); *H02J 2007/005* (2013.01); *H02J 2007/0067* (2013.01); *H02J 2007/0096* (2013.01)

(58) Field of Classification Search
    USPC .................. 320/107, 112, 128, 132, 149
    See application file for complete search history.

(56) References Cited

U.S. PATENT DOCUMENTS

| | | |
|---|---|---|
| 2005/0055157 A1 | 3/2005 | Scholl |
| 2005/0212483 A1 | 9/2005 | Li |
| 2006/0142915 A1 | 6/2006 | Isono et al. |
| 2012/0136574 A1 | 5/2012 | Kobayashi et al. |
| 2013/0204471 A1 | 8/2013 | O'Connell et al. |

FOREIGN PATENT DOCUMENTS

| | | |
|---|---|---|
| CN | 1605963 A | 4/2005 |
| CN | 2762449 Y | 3/2006 |
| CN | 1759023 A | 4/2006 |
| CN | 101202555 A | 6/2008 |
| CN | 101610304 A | 12/2009 |
| CN | 101945328 A | 1/2011 |
| CN | 102460073 A | 5/2012 |
| CN | 202218054 U | 5/2012 |
| CN | 102991497 A | 3/2013 |
| CN | 103296740 A | 9/2013 |
| CN | 103491262 A | 1/2014 |
| CN | 103500002 A | 1/2014 |
| CN | 103596252 A | 2/2014 |
| EP | 1 505 555 A1 | 2/2005 |
| JP | 2012-115066 | 6/2012 |

OTHER PUBLICATIONS

Extended European Search Report dated Jan. 26, 2018 in related European Patent Application No. 16742689.9, 7 pp.
International Search Report dated Apr. 22, 2016 in corresponding International Patent Application No. PCT/CN2016/071571.
Written Opinion of the International Searching Authority dated Apr. 22, 2016 in corresponding International Patent Application No. PCT/CN2016/071571.

ENERGY MANAGEMENT METHOD FOR A DEVICE WITH A RECHARGEABLE BATTERY

CROSS-REFERENCE TO RELATED APPLICATIONS

This application is a continuation of International Application No. PCT/CN2016/071571, filed on Jan. 21, 2016, which claims priority to Chinese Patent Application No. 201510052147.X, filed on Jan. 30, 2015, The disclosures of the aforementioned applications are hereby incorporated by reference in their entireties.

TECHNICAL FIELD

The present invention relates to the field of battery technologies, and in particular, to a device including a rechargeable-battery and an energy management method for the device.

BACKGROUND

With continuous development of electronic technologies, people have become increasingly dependent on mobile devices, and in addition, electric vehicles are also widely applied. The electric vehicles and the mobile devices are devices including a rechargeable battery, and are generally powered by using rechargeable batteries. When residual electric quantities of the batteries of the electric vehicles and the mobile devices are low, the batteries need to be charged, to ensure normal operating of the electric vehicles and the mobile devices.

Currently, various types of self-service emergency charging stations have begun to emerge on the market, to help resolve an emergency charging problem. The charging stations include mobile phone charging stations, wireless charging stations, vehicle charging stations, and the like, which are considered as charging resource public facilities. However, a battery endurance problem causes inconvenience of use to users, and consequently, user experience is easily degraded. Specifically, endurance capabilities of the electric vehicles and the mobile devices are poor. Currently, rechargeable resources of the electric vehicles include charging piles and battery swapping stations, but promotion of the charging piles and the battery swapping stations is poor in countries. Moreover, the rechargeable resources of the electric vehicle are scare as well. As functions of the mobile devices become rich, the mobile devices are also confronted with a battery endurance problem. In the prior art, residual electric quantities of the batteries of the mobile devices are relatively low and not durable, and high-capacity batteries of the mobile devices have not been developed yet at present. Therefore, once users find that capacities of electric vehicles and mobile devices are low, the users charge the electric vehicles and the mobile devices, but the users never consider whether charging is available in environments in which the electric vehicles and the mobile devices are located. For example, when a user is near a shopping mall, the user can charge an electric vehicle or a mobile device at any time. In this case, the user may enable various entertainment functions at will and never needs to worry about whether a residual electric quantity of the electric vehicle or the mobile device is low. For example, when a user is in the wild, if the user finds that a residual electric quantity of an electric vehicle or a mobile device is low, and the electric vehicle or the mobile device needs to be charged, inconvenience of use is caused to the user because charging is unavailable for the electric vehicle or the mobile device in the wild at the moment.

SUMMARY

To resolve a main technical problem, the present invention provides a device including a rechargeable-battery and an energy management method for the device, so that a corresponding energy management policy can be generated according to energy availability of the device including a rechargeable-battery, to effectively improve a battery endurance capability.

A first aspect of the present invention provides an energy management method for a device including a rechargeable-battery, where the energy management method includes: obtaining, by the device including a rechargeable-battery, information that is related to energy availability, where the information that is related to energy availability includes information that indicates whether the device including a rechargeable-battery is rechargeable, position information of a charging resource, information about a scenario in which the device including a rechargeable-battery is located, or a detection characteristic signal sent by the charging resource, and the position information of the charging resource includes a distance between the device including a rechargeable-battery and the charging resource; analyzing, by the device including a rechargeable-battery according to the information that is related to energy availability, the energy availability of the device including a rechargeable-battery, and determining, according to an analysis result, an energy availability level of the device including a rechargeable-battery, where the energy availability is used to measure a probability that the device including a rechargeable-battery obtains a charging opportunity, and the energy availability level includes a first preset level and a second preset level; and generating, by the device including a rechargeable-battery, an energy management policy according to the energy availability level, where the energy management policy includes a first preset policy corresponding to the first preset level and a second preset policy corresponding to the second preset level.

With reference to the first aspect, in a first possible implementation manner of the first aspect, the energy management method further includes: executing, by the device including a rechargeable-battery, the energy management policy.

With reference to the first possible implementation manner of the first aspect, in a second possible implementation manner, the step of obtaining, by the device including a rechargeable-battery, information that is related to energy availability includes: obtaining, by the device including a rechargeable-battery, the information that is related to energy availability and that is manually entered by a user into the device including a rechargeable-battery.

With reference to the second possible implementation manner of the first aspect, in a third possible implementation manner, the step of analyzing, by the device including a rechargeable-battery according to the information that is related to energy availability, the energy availability of the device including a rechargeable-battery, and determining, according to an analysis result, an energy availability level of the device including a rechargeable-battery includes: when the device including a rechargeable-battery indicates that the device including a rechargeable-battery is rechargeable, determining, by the device including a rechargeable-battery, that the energy availability level of the device including a rechargeable-battery is the first preset level; or when the device including a rechargeable-battery indicates that the device including a rechargeable-battery is non-rechargeable, determining, by the device including a rechargeable-battery, that the energy availability level of the device including a rechargeable-battery is the second preset level.

With reference to the second possible implementation manner of the first aspect, in a fourth possible implementation manner, the step of analyzing, by the device including a rechargeable-battery according to the information that is related to energy availability, the energy availability of the device including a rechargeable-battery, and determining, according to an analysis result, an energy availability level of the device including a rechargeable-battery includes: determining, by the device including a rechargeable-battery, whether the distance between the device including a rechargeable-battery and the charging resource is less than a preset distance value; and when determining that the distance between the device including a rechargeable-battery and the charging resource is less than the preset distance value, determining, by the device including a rechargeable-battery, that the energy availability level of the device including a rechargeable-battery is the first preset level; or when determining that the distance between the device including a rechargeable-battery and the charging resource is not less than the preset distance value, determining, by the device including a rechargeable-battery, that the energy availability level of the device including a rechargeable-battery is the second preset level.

With reference to the second possible implementation manner of the first aspect, in a fifth possible implementation manner, the step of analyzing, by the device including a rechargeable-battery according to the information that is related to energy availability, the energy availability of the device including a rechargeable-battery, and determining, according to an analysis result, an energy availability level of the device including a rechargeable-battery includes: comparing, by the device including a rechargeable-battery, the scenario in which the device including a rechargeable-battery is located with a preset scenario table, where the preset scenario table includes a first preset scenario and a second preset scenario; and when determining that the scenario in which the device including a rechargeable-battery is located is the first preset scenario, determining, by the device including a rechargeable-battery, that the energy availability level of the device including a rechargeable-battery is the first preset level; or when determining that the scenario in which the device including a rechargeable-battery is located is the second preset scenario, determining, by the device including a rechargeable-battery, that the energy availability level of the device including a rechargeable-battery is the second preset level.

With reference to the first possible implementation manner of the first aspect, in a sixth possible implementation manner, the step of obtaining, by the device including a rechargeable-battery, information that is related to energy availability includes: automatically obtaining, by the device including a rechargeable-battery, the information that is related to energy availability.

With reference to the sixth possible implementation manner of the first aspect, in a seventh possible implementation manner, the automatically obtaining, by the device including a rechargeable-battery, the information that is related to energy availability includes: positioning, by the device including a rechargeable-battery by using a positioning device, the information about the scenario in which the device including a rechargeable-battery is located, where the positioning device includes a GPS device, an indoor positioning sensor, or an environmental sensor; and the analyzing, by the device including a rechargeable-battery according to the information that is related to energy availability, the energy availability of the device including a rechargeable-battery, and determining, according to an analysis result, an energy availability level of the device including a rechargeable-battery includes: comparing, by the device including a rechargeable-battery, the scenario in which the device including a rechargeable-battery is located with a preset scenario table, where the preset scenario table includes a first preset scenario and a second preset scenario; and when determining that the scenario in which the device including a rechargeable-battery is located is the first preset scenario, determining, by the device including a rechargeable-battery, that the energy availability level of the device including a rechargeable-battery is the first preset level; or when determining that the scenario in which the device including a rechargeable-battery is located is the second preset scenario, determining, by the device including a rechargeable-battery, that the energy availability level of the device including a rechargeable-battery is the second preset level.

With reference to the sixth possible implementation manner of the first aspect, in an eighth possible implementation manner, the automatically obtaining, by the device including a rechargeable-battery, the information that is related to energy availability includes: positioning, by the device including a rechargeable-battery by using a positioning device, information about an actual position in which the device including a rechargeable-battery is located, where the positioning device includes a GPS device, an indoor positioning sensor, or an environmental sensor; reporting, by the device including a rechargeable-battery to a server, the information about the actual position in which the device including a rechargeable-battery is located, so that the server queries for the distance between the device including a rechargeable-battery and the charging resource; and receiving, by the device including a rechargeable-battery, the position information of the charging resource sent by the server, where the position information of the charging resource includes the distance between the device including a rechargeable-battery and the charging resource; and the analyzing, by the device including a rechargeable-battery according to the information that is related to energy availability, the energy availability of the device including a rechargeable-battery, and determining, according to an analysis result, an energy availability level of the device including a rechargeable-battery includes: determining, by the device including a rechargeable-battery, whether the distance between the device including a rechargeable-battery and the charging resource is less than a preset distance value; and when determining that the distance between the device including a rechargeable-battery and the charging resource is less than the preset distance value, determining, by the device including a rechargeable-battery, that the energy availability level of the device including a rechargeable-battery is the first preset level; or when determining that the distance between the device including a rechargeable-battery and the charging resource is not less than the preset distance value, determining, by the device including a rechargeable-battery, that the energy availability level of the device including a rechargeable-battery is the second preset level.

With reference to the sixth possible implementation manner of the first aspect, in a ninth possible implementation manner, the automatically obtaining, by the device including a rechargeable-battery, the information that is related to energy availability includes: receiving, by the device including a rechargeable-battery, the detection characteristic signal sent by the charging resource; and the analyzing, by the device including a rechargeable-battery according to the information that is related to energy availability, the energy availability of the device including a rechargeable-battery, and determining, according to an analysis result, an energy availability level of the device including a rechargeable-battery includes: determining, by the device including a rechargeable-battery, whether a signal strength of the detection characteristic signal is greater than a preset signal strength; and when determining that the signal strength of the detection characteristic signal is greater than the preset signal strength, determining, by the device including a rechargeable-battery, that the energy availability level of the device including a rechargeable-battery is the first preset level; or when determining that the signal strength of the detection characteristic signal is not greater than the preset signal strength, determining, by the device including a rechargeable-battery, that the energy availability level of the device including a rechargeable-battery is the second preset level.

A second aspect of the present invention provides a device including a rechargeable-battery, where the device including a rechargeable-battery includes: an information obtaining module, configured to obtain information that is related to energy availability, where the information that is related to energy availability includes information that indicates whether the device including a rechargeable-battery is rechargeable, position information of a charging resource, information about a scenario in which the device including a rechargeable-battery is located, or a detection characteristic signal sent by the charging resource, and the position information of the charging resource includes a distance between the device including a rechargeable-battery and the charging resource; an energy level generation module, configured to: analyze, according to the information that is related to energy availability, the energy availability of the device including a rechargeable-battery, and determine, according to an analysis result, an energy availability level of the device including a rechargeable-battery, where the energy availability is used to measure a probability that the device including a rechargeable-battery obtains a charging opportunity, and the energy availability level includes a first preset level and a second preset level; and a policy generation module, configured to generate an energy management policy according to the energy availability level, where the energy management policy includes a first preset policy corresponding to the first preset level and a second preset policy corresponding to the second preset level.

With reference to the second aspect, in a first possible implementation manner, the device including a rechargeable-battery further includes: an energy execution module, configured to execute the energy management policy.

With reference to the first possible implementation manner of the second aspect, in a second possible implementation manner, the information obtaining module includes a module for manually obtaining information, where the module for manually obtaining information is configured to obtain the information that is related to energy availability and that is manually entered by a user into the device including a rechargeable-battery.

With reference to the second possible implementation manner of the second aspect, in a third possible implementation manner, the energy level generation module includes: a first energy level unit, configured to: when the device including a rechargeable-battery indicates that the device including a rechargeable-battery is rechargeable, determine that the energy availability level of the device including a rechargeable-battery is the first preset level; or a second energy level unit, configured to: when the device including a rechargeable-battery indicates that the device including a rechargeable-battery is non-rechargeable, determine that the energy availability level of the device including a rechargeable-battery is the second preset level.

With reference to the second possible implementation manner of the second aspect, in a fourth possible implementation manner, the energy level generation module includes: a distance determining unit, configured to determine whether the distance between the device including a rechargeable-battery and the charging resource is less than a preset distance value; and a first energy level unit, configured to: when the distance determining unit determines that the distance between the device including a rechargeable-battery and the charging resource is less than the preset distance value, determine that the energy availability level of the device including a rechargeable-battery is the first preset level; or a second energy level unit, configured to: when the distance determining unit determines that the distance between the device including a rechargeable-battery and the charging resource is not less than the preset distance value, determine that the energy availability level of the device including a rechargeable-battery is the second preset level.

With reference to the second possible implementation manner of the second aspect, in a fifth possible implementation manner, the energy level generation module includes: a scenario determining unit, configured to compare the scenario in which the device including a rechargeable-battery is located with a preset scenario table, where the preset scenario table includes a first preset scenario and a second preset scenario; and a first energy level unit, configured to: when the scenario determining unit determines that the scenario in which the device including a rechargeable-battery is located is the first preset scenario, determine that the energy availability level of the device including a rechargeable-battery is the first preset level; or a second energy level unit, configured to: when the scenario determining unit determines that the scenario in which the device including a rechargeable-battery is located is the second preset scenario, determine that the energy availability level of the device including a rechargeable-battery is the second preset level.

With reference to the first possible implementation manner of the second aspect, in a sixth possible implementation manner, the information obtaining module includes a module for automatically obtaining information, where the module for automatically obtaining information is configured to automatically obtain the information that is related to energy availability.

With reference to the sixth possible implementation manner of the second aspect, in a seventh possible implementation manner, the module for automatically obtaining information includes: a scenario positioning unit, configured to position, by using a positioning device, the information about the scenario in which the device including a rechargeable-battery is located, where the positioning device includes a GPS device, an indoor positioning sensor, or an environmental sensor; and the energy level generation module includes: a scenario determining unit, configured to compare the scenario in which the device including a rechargeable-battery is located with a preset scenario table, where the preset scenario table includes a first preset scenario and a second preset scenario; and a first energy level unit, configured to: when the scenario determining unit determines that the scenario in which the device including a rechargeable-battery is located is the first preset scenario, determine that the energy availability level of the device including a rechargeable-battery is the first preset level; or a second energy level unit, configured to: when the scenario determining unit determines that the scenario in which the device including a rechargeable-battery is located is the second preset scenario, determine that the energy availability level of the device including a rechargeable-battery is the second preset level.

With reference to the sixth possible implementation manner of the second aspect, in an eighth possible implementation manner, the module for automatically obtaining information includes: a distance positioning unit, configured to position, by using a positioning device, information about an actual position in which the device including a rechargeable-battery is located, where the positioning device includes a GPS device, an indoor positioning sensor, or an environmental sensor; a sending unit, configured to report, to a server, the information about the actual position in which the device including a rechargeable-battery is located, so that the server queries for the distance between the device including a rechargeable-battery and the charging resource; and a receiving unit, configured to receive the position information of the charging resource sent by the server, where the position information of the charging resource includes the distance between the device including a rechargeable-battery and the charging resource; and the energy level generation module includes: a distance determining unit, configured to determine whether the distance between the device including a rechargeable-battery and the charging resource is less than a preset distance value; and a first energy level unit, configured to: when the distance determining unit determines that the distance between the device including a rechargeable-battery and the charging resource is less than the preset distance value, determine that the energy availability level of the device including a rechargeable-battery is the first preset level; or a second energy level unit, configured to: when the distance determining unit determines that the distance between the device including a rechargeable-battery and the charging resource is not less than the preset distance value, determine that the energy availability level of the device including a rechargeable-battery is the second preset level.

With reference to the sixth possible implementation manner of the second aspect, in a ninth possible implementation manner, the module for automatically obtaining information includes: a receiving unit, configured to receive the detection characteristic signal sent by the charging resource; and the energy level generation module includes: a signal strength determining unit, configured to determine whether a signal strength of the detection characteristic signal is greater than a preset signal strength; and a first energy level unit, configured to: when the signal strength determining unit determines that the signal strength of the detection characteristic signal is greater than the preset signal strength, determine that the energy availability level of the device including a rechargeable-battery is the first preset level; or a second energy level unit, configured to: when the signal strength determining unit determines that the signal strength of the detection characteristic signal is not greater than the preset signal strength, determine that the energy availability level of the device including a rechargeable-battery is the second preset level.

A third aspect of the present invention provides a device including a rechargeable-battery, including a transceiver, a processor, and a bus; and the transceiver and the processor are connected by using the bus, where the transceiver is configured to obtain information that is related to energy availability, where the information that is related to energy availability includes information that indicates whether the device including a rechargeable-battery is rechargeable, position information of a charging resource, information about a scenario in which the device including a rechargeable-battery is located, or a detection characteristic signal sent by the charging resource, and the position information of the charging resource includes a distance between the device including a rechargeable-battery and the charging resource; the processor is configured to: analyze, according to the information that is related to energy availability, the energy availability of the device including a rechargeable-battery, and determine, according to an analysis result, an energy availability level of the device including a rechargeable-battery, where the energy availability is used to measure a probability that the device including a rechargeable-battery obtains a charging opportunity, and the energy availability level includes a first preset level and a second preset level; and the processor is further configured to generate an energy management policy according to the energy availability level, where the energy management policy includes a first preset policy corresponding to the first preset level and a second preset policy corresponding to the second preset level.

With reference to the third aspect, in a first possible implementation manner, the processor is further configured to execute the energy management policy.

With reference to the first possible implementation manner of the third aspect, in a second possible implementation manner, the transceiver is configured to obtain the information that is related to energy availability and that is manually entered by a user into the device including a rechargeable-battery.

With reference to the second possible implementation manner of the third aspect, in a third possible implementation manner, the processor is configured to: when the device including a rechargeable-battery indicates that the device including a rechargeable-battery is rechargeable, determine that the energy availability level of the device including a rechargeable-battery is the first preset level; or the processor is further configured to: when the device including a rechargeable-battery indicates that the device including a rechargeable-battery is non-rechargeable, determine that the energy availability level of the device including a rechargeable-battery is the second preset level.

With reference to the second possible implementation manner of the third aspect, in a fourth possible implementation manner, the processor is configured to determine whether the distance between the device including a rechargeable-battery and the charging resource is less than a preset distance value; and the processor is further configured to: when determining that the distance between the device including a rechargeable-battery and the charging resource is less than the preset distance value, determine that the energy availability level of the device including a rechargeable-battery is the first preset level; or the processor is further configured to: when determining that the distance between the device including a rechargeable-battery and the charging resource is not less than the preset distance value, determine that the energy availability level of the device including a rechargeable-battery is the second preset level.

With reference to the second possible implementation manner of the third aspect, in a fifth possible implementation manner, the processor is configured to compare the scenario in which the device including a rechargeable-battery is located with a preset scenario table, where the preset scenario table includes a first preset scenario and a second preset scenario; and the processor is further configured to: when determining that the scenario in which the device including a rechargeable-battery is located is the first preset scenario, determine that the energy availability level of the device including a rechargeable-battery is the first preset level; or the processor is further configured to: when determining that the scenario in which the device including a rechargeable-battery is located is the second preset scenario, determine that the energy availability level of the device including a rechargeable-battery is the second preset level.

With reference to the first possible implementation manner of the third aspect, in a sixth possible implementation manner, the transceiver is configured to automatically obtain the information that is related to energy availability.

With reference to the sixth possible implementation manner of the third aspect, in a seventh possible implementation manner, the transceiver is configured to position, by using a positioning device, the information about the scenario in which the device including a rechargeable-battery is located, where the positioning device includes a GPS device, an indoor positioning sensor, or an environmental sensor; the processor is configured to compare the scenario in which the device including a rechargeable-battery is located with a preset scenario table, where the preset scenario table includes a first preset scenario and a second preset scenario; and the processor is further configured to: when determining that the scenario in which the device including a rechargeable-battery is located is the first preset scenario, determine that the energy availability level of the device including a rechargeable-battery is the first preset level; or the processor is further configured to: when determining that the scenario in which the device including a rechargeable-battery is located is the second preset scenario, determine that the energy availability level of the device including a rechargeable-battery is the second preset level.

With reference to the sixth possible implementation manner of the third aspect, in an eighth possible implementation manner, the transceiver is configured to position, by using a positioning device, information about an actual position in which the device including a rechargeable-battery is located, where the positioning device includes a GPS device, an indoor positioning sensor, or an environmental sensor; the transceiver is further configured to report, to a server, the information about the actual position in which the device including a rechargeable-battery is located, so that the server queries for the distance between the device including a rechargeable-battery and the charging resource; the transceiver is further configured to receive the position information of the charging resource sent by the server, where the position information of the charging resource includes the distance between the device including a rechargeable-battery and the charging resource; the processor is configured to determine whether the distance between the device including a rechargeable-battery and the charging resource is less than a preset distance value; and the processor is further configured to: when determining that the distance between the device including a rechargeable-battery and the charging resource is less than the preset distance value, determine that the energy availability level of the device including a rechargeable-battery is the first preset level; or the processor is further configured to: when determining that the distance between the device including a rechargeable-battery and the charging resource is not less than the preset distance value, determine that the energy availability level of the device including a rechargeable-battery is the second preset level.

With reference to the sixth possible implementation manner of the third aspect, in a ninth possible implementation manner, the transceiver is configured to receive the detection characteristic signal sent by the charging resource; the processor is configured to determine whether a signal strength of the detection characteristic signal is greater than a preset signal strength; and the processor is further configured to: when determining that the signal strength of the detection characteristic signal is greater than the preset signal strength, determine that the energy availability level of the device including a rechargeable-battery is the first preset level; or the processor is further configured to: when determining that the signal strength of the detection characteristic signal is not greater than the preset signal strength, determine that the energy availability level of the device including a rechargeable-battery is the second preset level.

In the foregoing solutions, the energy management method in the present invention includes: obtaining, by a device including a rechargeable-battery, information that is related to energy availability; analyzing, by the device including a rechargeable-battery according to the information that is related to energy availability, the energy availability of the device including a rechargeable-battery, and determining, according to an analysis result, an energy availability level of the device including a rechargeable-battery; generating, by the device including a rechargeable-battery, an energy management policy according to the energy availability level; and executing, by the device including a rechargeable-battery, the energy management policy, so as to improve a battery endurance capability of the device including a rechargeable-battery, and effectively improve user experience.

DESCRIPTION OF EMBODIMENTS

In the following, the present invention is described in detail with reference to the accompanying drawings and implementation manners.

Figure 1:
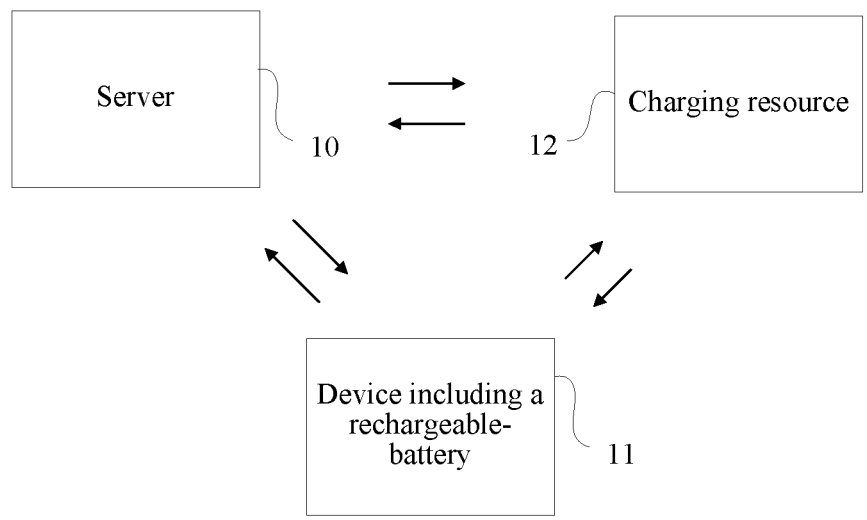
FIG. 1 is a physical schematic diagram of a charging system according to the present invention.

As shown in FIG. 1, a charging system includes a server 10, a device including a rechargeable-battery 11, and a charging resource 12. The server 10 can communicate with the device including a rechargeable-battery 11, and the charging resource 12 can supply power to the device including a rechargeable-battery 11. In this embodiment, the device including a rechargeable-battery 11 is a mobile device or an electric vehicle, where the mobile device may be a mobile phone, a tablet computer, a notebook computer, or a wearable device. The charging resource 12 is a charging station, and the charging station can charge a mobile device and an electric vehicle. It should be understood that, the charging station may be a fixed power cable, a fixed charger, a mobile charger, a wireless charging transmitter, a device supplying power, or the like. Alternatively, the device including a rechargeable-battery 11 may be another device including a rechargeable-battery.

Figure 2:
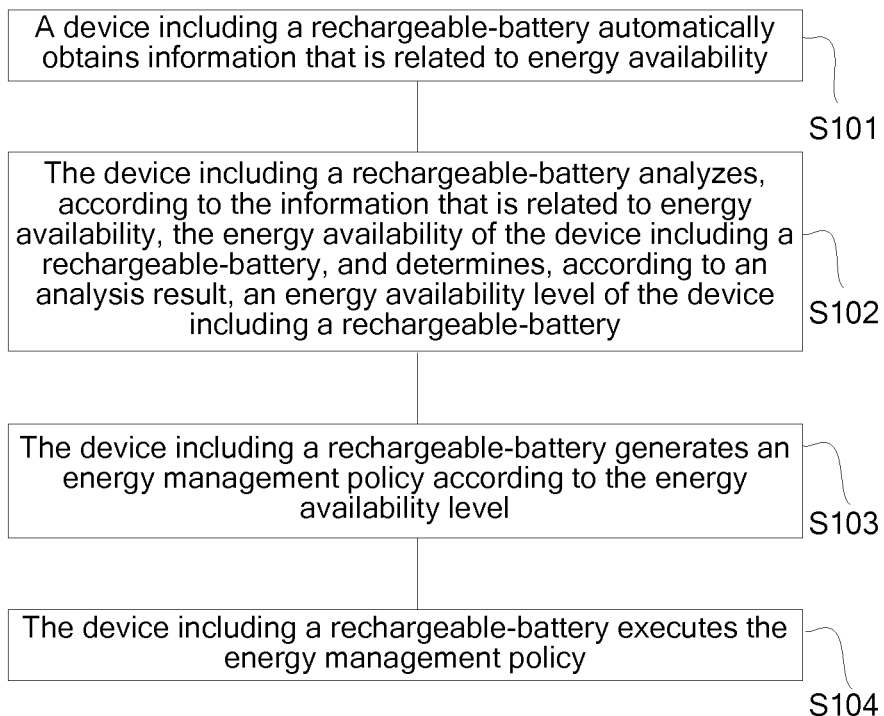
FIG. 2 is a schematic flowchart of a first embodiment of an energy management method for a device including a rechargeable-battery according to the present invention.

Further referring to FIG. 2, FIG. 2 is a schematic flowchart of a first embodiment of an energy management method for a device including a rechargeable-battery according to the present invention. The energy management method includes the following steps.

Step S101: The device including a rechargeable-battery 11 obtains information that is related to energy availability.

The information that is related to energy availability includes information that indicates whether the device including a rechargeable-battery 11 is rechargeable, position information of a charging resource 12, information about a scenario in which the device including a rechargeable-battery 11 is located, or a detection characteristic signal sent by the charging resource 12.

In step S101, the device including a rechargeable-battery 11 may obtain, at any comment, the information that is related to energy availability. Preferably, the device including a rechargeable-battery 11 obtains, at an interval, the information that is related to energy availability.

Alternatively, before step S101 is performed, it is first determined whether a residual electric quantity of the device including a rechargeable-battery 11 is less than a preset electric quantity value. If the residual electric quantity of the device including a rechargeable-battery 11 is less than the preset electric quantity value, step S101 is performed.

Step S102: The device including a rechargeable-battery 11 analyzes, according to the information that is related to energy availability, the energy availability of the device including a rechargeable-battery 11, and determines, according to an analysis result, an energy availability level of the device including a rechargeable-battery 11.

In this embodiment, the energy availability is used to measure a probability that the device including a rechargeable-battery 11 obtains a charging opportunity, that is, the energy availability is used to determine whether it is easy or relatively difficult to currently obtain the charging opportunity by the device including a rechargeable-battery 11.

The energy availability level includes a first preset level and a second preset level, where the first preset level is higher than the second preset level, and a higher energy availability level indicates a larger charging opportunity that the device including a rechargeable-battery 11 can obtain. The energy availability level includes an extremely high energy level, a high energy level, a middle energy level, a low energy level, and an extremely low energy level. The first preset level and the second preset level are separately one of the extremely high energy level, the high energy level, the middle energy level, the low energy level, or the extremely low energy level. It should be understood that, the energy availability level is a level that is set by a user, and the energy availability level may further include a third preset level, a fourth preset level, or more levels.

Step S103: The device including a rechargeable-battery 11 generates an energy management policy according to the energy availability level.

The energy management policy includes a first preset policy and a second preset policy. When the energy availability level of the device including a rechargeable-battery 11 is the first preset level, the device including a rechargeable-battery 11 generates the first preset policy; and when the energy availability level of the device including a rechargeable-battery 11 is the second preset level, the device including a rechargeable-battery 11 generates the second preset policy. In this embodiment, the energy management policy includes a battery saving mode, a function limitation, or a program limitation, and the first preset policy and the second preset policy are separately one of or a combination of more than one of the battery saving mode, the function limitation, or the program limitation. It should be understood that, the energy management policy is a policy that is set by the user, and the energy management policy may further include a third preset policy, a fourth preset policy, or more policies.

Step S104: The device including a rechargeable-battery 11 executes the energy management policy.

Specifically, the energy management policy and the energy availability level are shown in the following Table 1:

TABLE 1

| Energy availability | Program limitation (First preset policy) | Function limitation (Second preset policy) | Battery saving mode (Third preset policy) |
|---|---|---|---|
| Extremely high | No limitation | No limitation | No limitation |
| High | Limitation on a power consumption quota of a high power consumption program | Limitation on a power consumption quota of a high power consumption function | No limitation |
| Middle | Limitation on use of a high power consumption program | Limitation on use of a high power consumption function | Normal |
| Low | Limitation on high and middle power consumption programs | Limitation on high and middle power consumption functions | Battery saving |
| Extremely low | Preservation of only a system program | Preservation of only a basic communication function | Super battery saving |

It should be understood that, the energy management policies corresponding to the preset policies listed in Table 1 are not limited in the present invention, and the user may further particularly set a preset policy according to an actual need.

In this embodiment, information that is related to energy availability is obtained; energy availability level of a device including a rechargeable-battery is determined according to the information that is related to energy availability; and a corresponding energy management policy is generated according to the energy availability level, so that a battery endurance capability is effectively improved.

Figure 3:
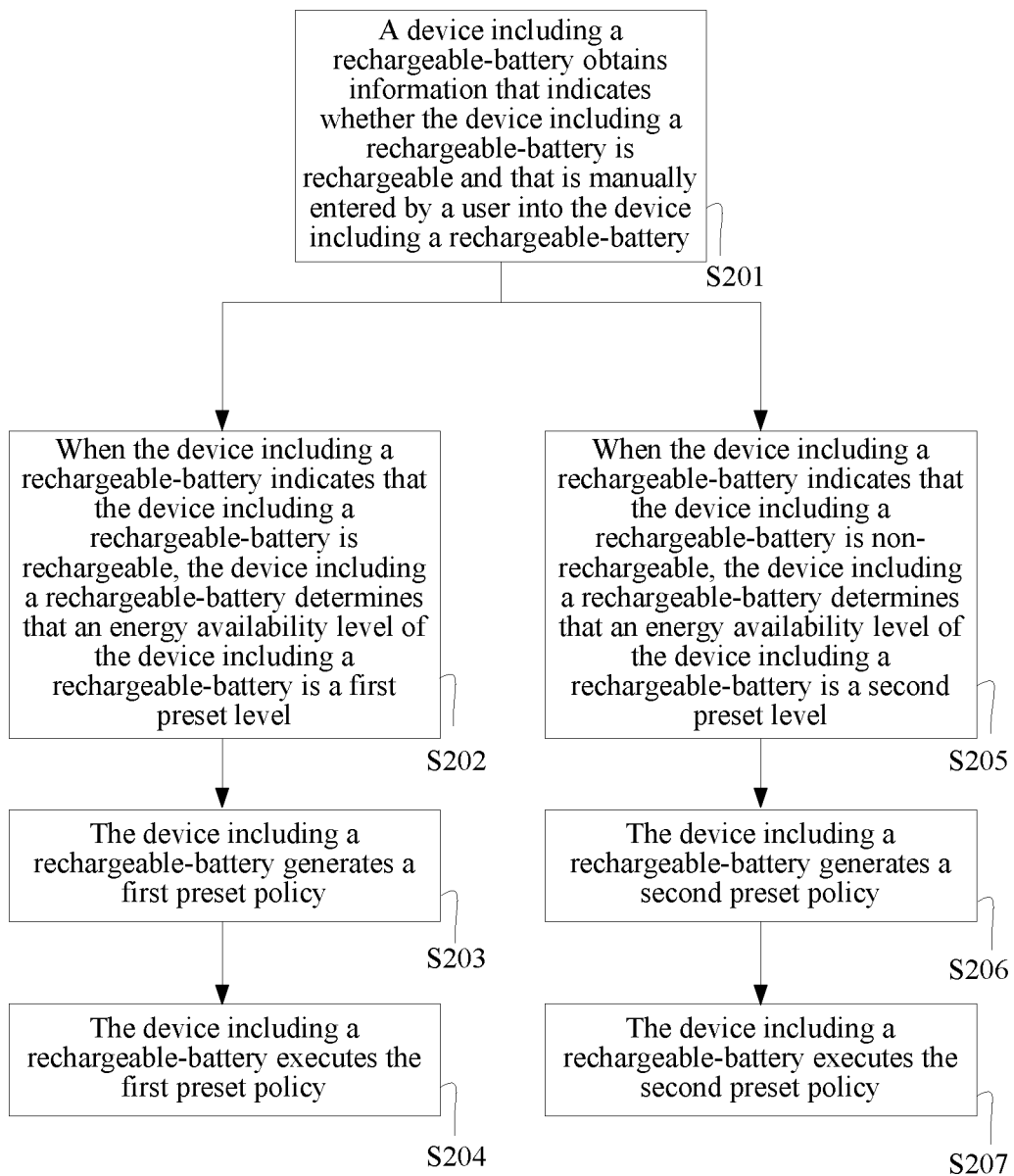
FIG. 3 is a schematic flowchart of a second embodiment of an energy management method for a device including a rechargeable-battery according to the present invention.

Further referring to FIG. 3, FIG. 3 is a schematic flowchart of a second embodiment of an energy management method for a device including a rechargeable-battery according to the present invention. The energy management method in FIG. 3 includes the following steps.

Step S201: The device including a rechargeable-battery 11 obtains information that indicates whether the device including a rechargeable-battery 11 is rechargeable and that is manually entered by a user into the device including a rechargeable-battery 11.

Optionally, before step S201 is performed, when the device including a rechargeable-battery 11 determines that a residual electric quantity of the device including a rechargeable-battery 11 is less than a preset value, the device including a rechargeable-battery 11 automatically prompts the user to directly enter the information that indicates whether the device including a rechargeable-battery 11 is rechargeable, where the information is mainly used to determine whether the current device including a rechargeable-battery 11 is rechargeable.

Step S202: When the device including a rechargeable-battery 11 indicates that the device including a rechargeable-battery 11 is rechargeable, the device including a rechargeable-battery 11 determines that an energy availability level of the device including a rechargeable-battery 11 is a first preset level. In this case, it indicates that the energy availability level of the device including a rechargeable-battery 11 is high, and the user can charge the device including a rechargeable-battery 11 at any time and at any place.

Step S203: The device including a rechargeable-battery 11 generates a first preset policy.

Step S204: The device including a rechargeable-battery 11 executes the first preset policy. For a specific manner, refer to the corresponding policy in Table 1. For example, when the first preset level is extremely high and the first preset policy is a program limitation, no power consumption limitation is imposed on the device including a rechargeable-battery 11; or for example, when the first preset level is middle and the first preset policy is a battery saving mode, the device including a rechargeable-battery 11 consumes power normally; or for example, when the first preset level is low and the first preset policy is a program limitation and a battery saving mode, the device including a rechargeable-battery 11 limits high and middle power consumption programs and enters the battery saving mode.

Step S205: When the device including a rechargeable-battery 11 indicates that the device including a rechargeable-battery 11 is non-rechargeable, the device including a rechargeable-battery 11 determines that the energy availability level of the device including a rechargeable-battery 11 is a second preset level. In this case, it indicates the energy availability level of the device including a rechargeable-battery 11 is low, and the user is less likely to charge the device including a rechargeable-battery 11. In this case, an energy management policy of the device including a rechargeable-battery 11 needs to be adjusted to reduce current energy consumption.

Step S206: The device including a rechargeable-battery 11 generates a second preset policy.

Step S207: The device including a rechargeable-battery 11 executes the second preset policy. The second preset policy may be limiting running of some unnecessary functions or limiting running of an application program. For a specific manner, refer to the corresponding policy in Table 1. For example, when the second preset level is middle and the second preset policy is a function limitation, the device including a rechargeable-battery 11 limits use of a high power consumption function; or for example, when the second preset level is extremely low and the second preset policy is a program limitation, the device including a rechargeable-battery 11 preserves only a system program; or for example, when the second preset level is extremely low and the second preset policy is a program limitation and a battery saving mode, the device including a rechargeable-battery 11 preserves only a system program and enters a super battery saving mode.

In this embodiment, information that indicates whether a device including a rechargeable-battery is rechargeable is manually entered; an energy availability level of the device including a rechargeable-battery is determined according to whether the current device including a rechargeable-battery is rechargeable; and a corresponding energy management policy is generated according to the energy availability level, so that a battery endurance capability is effectively improved.

Figure 4:
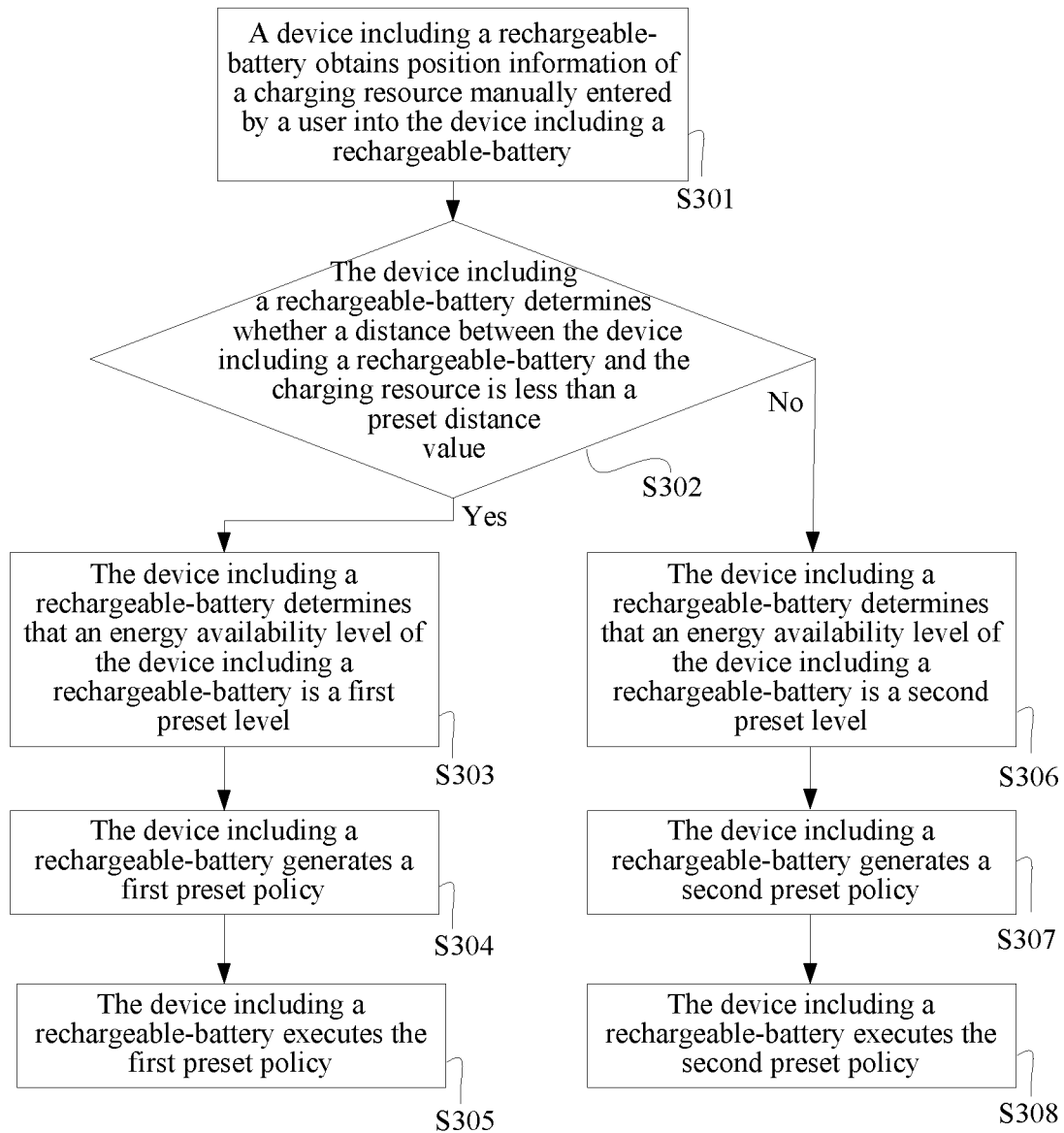
FIG. 4 is a schematic flowchart of a third embodiment of an energy management method for a device including a rechargeable-battery according to the present invention.

Further referring to FIG. 4, FIG. 4 is a schematic flowchart of a third embodiment of an energy management method for a device including a rechargeable-battery according to the present invention. Step S304, step S305, step S307, and step S308 of the energy management method in FIG. 4 are the same as step S203, step S204, step S206, and step S207 of the energy management method in FIG. 3, and a main difference between the energy management method in FIG. 4 and the energy management method in FIG. 3 lies in:

Step S301: The device including a rechargeable-battery 11 obtains position information of a charging resource 12 manually entered by a user into the device including a rechargeable-battery 11. The position information of the charging resource 12 includes a distance between the device including a rechargeable-battery 11 and the charging resource 12.

Optionally, before step S301 is performed, when the device including a rechargeable-battery 11 determines that a residual electric quantity of the device including a rechargeable-battery 11 is less than a preset value, the device including a rechargeable-battery 11 automatically prompts the user to directly enter the position information of the nearby charging resource 12. The distance between the device including a rechargeable-battery 11 and the charging resource 12 is obtained by using the position information of the charging resource 12, so that a closest charging resource 12 is found to charge the current device including a rechargeable-battery 11.

Step S302: The device including a rechargeable-battery 11 determines whether a distance between the device including a rechargeable-battery 11 and the charging resource 12 is less than a preset distance value.

If the device including a rechargeable-battery 11 determines that the distance between the device including a rechargeable-battery 11 and the charging resource 12 is less than the preset distance value, it indicates that it is easy for the user to arrive at a position of the charging resource 12 to charge the device including a rechargeable-battery 11. In this case, if an energy availability level of the device including a rechargeable-battery 11 is high, step S303 is performed: The device including a rechargeable-battery 11 determines that an energy availability level of the device including a rechargeable-battery 11 is a first preset level.

If the device including a rechargeable-battery 11 determines that the distance between the device including a rechargeable-battery 11 and the charging resource 12 is not less than the preset distance value, it indicates that the user is relatively far away from a position of the charging resource 12, and it takes the user a relatively long time to arrive. In this case, the energy availability level of the device including a rechargeable-battery 11 is low, and an energy management policy of the device including a rechargeable-battery 11 needs to be adjusted to reduce current energy consumption. Therefore, step S306 is performed: The device including a rechargeable-battery 11 determines that the energy availability level of the device including a rechargeable-battery 11 is a second preset level.

In this embodiment, a distance between a device including a rechargeable-battery and a charging resource is manually entered; an energy availability level of the device including a rechargeable-battery is determined according to the distance between the device including a rechargeable-battery and the charging resource; and a corresponding energy management policy is generated according to the energy availability level, so that a battery endurance capability is effectively improved.

Figure 5:
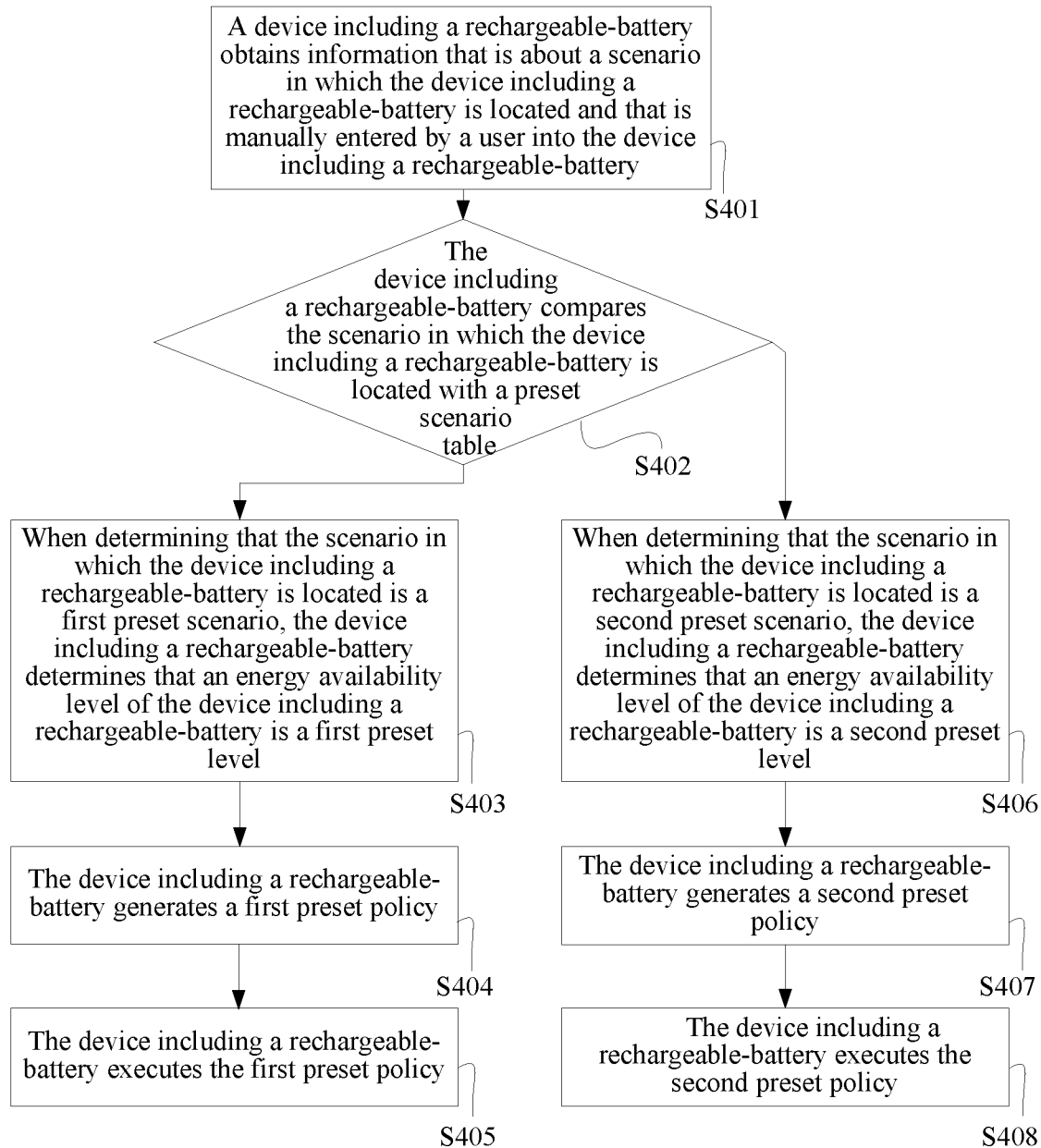
FIG. 5 is a schematic flowchart of a fourth embodiment of an energy management method for a device including a rechargeable-battery according to the present invention.

Further referring to FIG. 5, FIG. 5 is a schematic flowchart of a fourth embodiment of an energy management method for a device including a rechargeable-battery according to the present invention. Step S404, step S405, step S407, and step S408 of the energy management method in FIG. 5 are the same as step S203, step S204, step S206, and step S207 of the energy management method in FIG. 3, and a main difference between the energy management method in FIG. 5 and the energy management method in FIG. 3 lies in:

Step S401: The device including a rechargeable-battery 11 obtains information that is about a scenario in which the device including a rechargeable-battery 11 is located and that is manually entered by a user into the device including a rechargeable-battery 11.

In step S401, the device including a rechargeable-battery 11 determines, at an interval, whether the scenario in which the device including a rechargeable-battery 11 is located changes, and if the scenario in which the device including a rechargeable-battery 11 is located changes, the device including a rechargeable-battery 11 prompts the user to selectively enter information about a real-time scenario in which the device including a rechargeable-battery 11 is located.

Optionally, before step S401 is performed, when the device including a rechargeable-battery 11 determines that a residual electric quantity of the device including a rechargeable-battery 11 is less than a preset value, the device including a rechargeable-battery 11 automatically prompts the user to directly enter the information about the scenario in which the device including a rechargeable-battery 11 is located. It is determined, by using the information about the scenario in which the device including a rechargeable-battery 11 is located, whether a charging resource 12 is easily obtained in the scenario in which the device including a rechargeable-battery 11 is located, to facilitate charging of the current device including a rechargeable-battery 11.

Step S402: The device including a rechargeable-battery 11 compares the scenario in which the device including a rechargeable-battery 11 is located with a preset scenario table.

The preset scenario table includes a first preset scenario and a second preset scenario. The preset scenario table includes a home scenario, an office scenario, a shopping mall scenario, a restaurant scenario, a driving scenario, a bus scenario, an outdoor scenario, a wild scenario, and the like. The first preset scenario and the second preset scenario are separately one of the home scenario, the office scenario, the shopping mall scenario, the restaurant scenario, the driving scenario, the bus scenario, the outdoor scenario, or the wild scenario, and each scenario corresponds to a different energy availability level. It should be understood that, the preset scenario table is set by the user, and may further include a third preset scenario, a fourth preset scenario, or more preset scenarios.

Step S403: When determining that the scenario in which the device including a rechargeable-battery 11 is located is a first preset scenario, the device including a rechargeable-battery 11 determines that an energy availability level of the device including a rechargeable-battery 11 is a first preset level.

Step S406: When determining that the scenario in which the device including a rechargeable-battery 11 is located is a second preset scenario, the device including a rechargeable-battery 11 determines that the energy availability level of the device including a rechargeable-battery 11 is a second preset level.

Specifically, the energy availability level corresponding to the preset scenario table is shown in the following Table 2:

TABLE 2

| Preset scenario | Home | Office | Shopping mall | Restaurant | Driving | Bus | Outdoor | Wild |
|---|---|---|---|---|---|---|---|---|
| Energy availability level | Extremely high | High | Middle | Middle | Middle | Low | Low | Extremely low |

For example, as shown in Table 1 and Table 2, the device including a rechargeable-battery 11 determines that a current position is home. The user can charge, by using a power cable, the device including a rechargeable-battery 11 at any time, and energy availability of the device including a rechargeable-battery 11 is extremely high; therefore, no limitation needs to be imposed on energy consumption of the device including a rechargeable-battery 11. When the device including a rechargeable-battery 11 determines that the user gets out of home and takes a bus, the scenario in which the device including a rechargeable-battery 11 is located changes from home to the outdoor bus, and the corresponding energy availability level changes from extremely high to low. In this case, an energy management policy of the device including a rechargeable-battery 11 needs to be adjusted. For example, the device including a rechargeable-battery 11 enters a battery saving mode, and enables a limitation on use of a high power consumption program or function (such as a flashlight or a video) and a middle power consumption program or function, to avoid that basic communication and network functions of the device including a rechargeable-battery 11 cannot be satisfied due to excessive power consumption. When the device including a rechargeable-battery 11 determines that a current position is driving in the outside, the user can charge, by using a car charger, the device including a rechargeable-battery 11. In this case, the energy availability level of the device including a rechargeable-battery 11 is middle; and the device including a rechargeable-battery 11 controls to select the battery saving mode, and selects to preferentially power a communication function and a program such as a map application. In addition, when the scenario in which the device including a rechargeable-battery 11 is located is wild, the energy availability level of the device including a rechargeable-battery 11 changes to extremely low, and it indicates that it is difficult to obtain a charging opportunity in the wild. Therefore the device including a rechargeable-battery 11 preserves only a basic system program and function, and enters a super battery saving mode. It should be understood that, the device including a rechargeable-battery 11 in this embodiment is applicable to a mobile device.

In this embodiment, information about a scenario in which a device including a rechargeable-battery is located is manually entered; an energy availability level of the device including a rechargeable-battery is determined according to a result of comparing the scenario in which the device including a rechargeable-battery is located with a preset scenario table; and a corresponding energy management policy is generated according to the energy availability level, so that a battery endurance capability is effectively improved.

Figure 6:
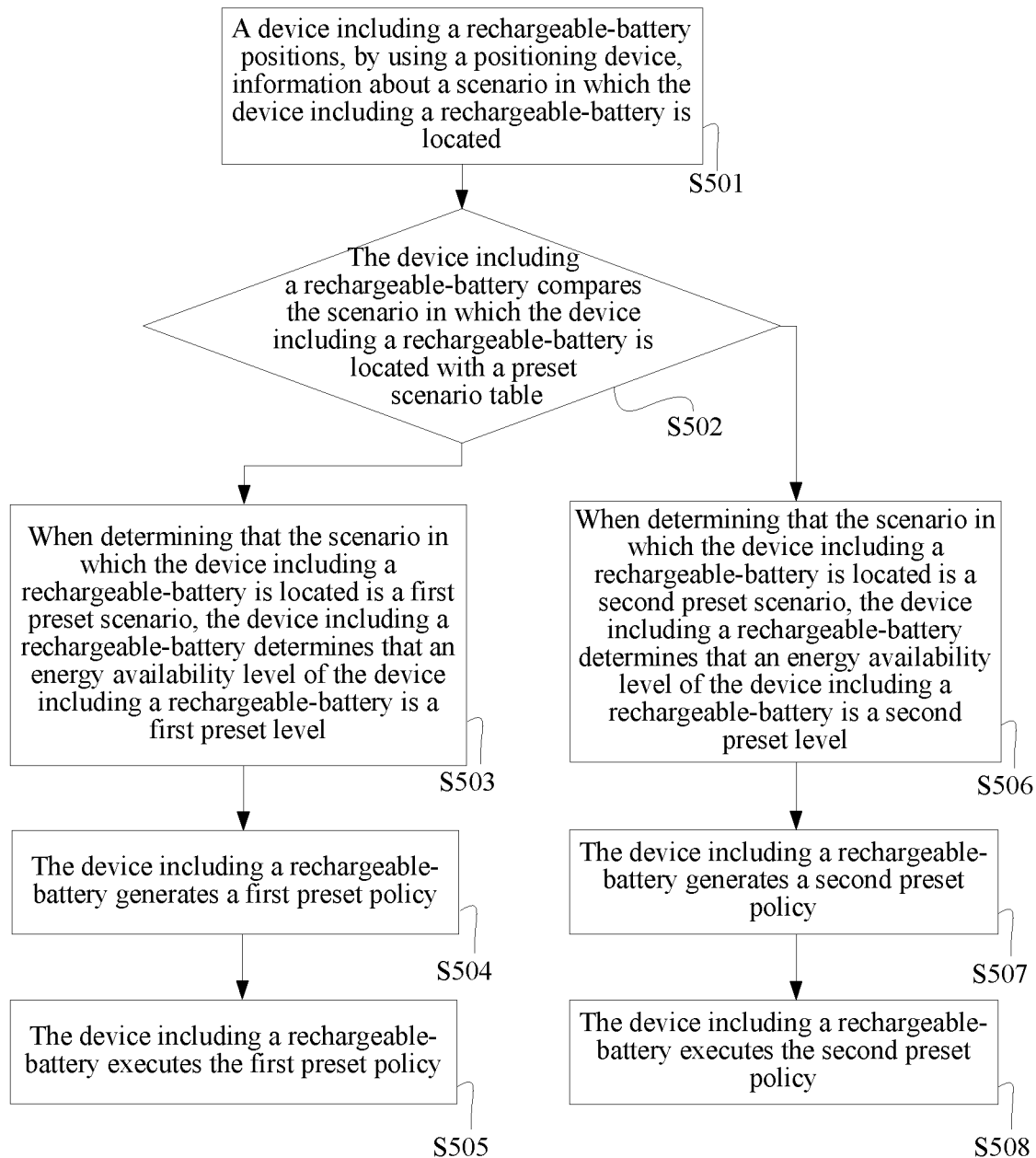
FIG. 6 is a schematic flowchart of a fifth embodiment of an energy management method for a device including a rechargeable-battery according to the present invention.

Further referring to FIG. 6, FIG. 6 is a schematic flowchart of a fifth embodiment of an energy management method for a device including a rechargeable-battery according to the present invention. Step S502, step S503, step S504, step S505, step S506, step S507, and step S508 of the energy management method in FIG. 6 are the same as step S402, step S403, step S404, step S405, step S406, step S407, and step S408 of the energy management method in FIG. 5, and a main difference between the energy management method in FIG. 6 and the energy management method in FIG. 5 lies in:

Step S501: The device including a rechargeable-battery 11 positions, by using a positioning device, information about a scenario in which the device including a rechargeable-battery 11 is located.

In step S501, the device including a rechargeable-battery 11 can be positioned, by using the positioning device, to be in one of a home scenario, an office scenario, a shopping mall scenario, a restaurant scenario, a driving scenario, a bus scenario, an outdoor scenario, or a wild scenario.

The positioning device includes a GPS (Global Positioning System, Global Positioning System) device, an indoor positioning sensor, an environmental sensor, an electronic compass, a gyroscope, an altitude sensor, and an acceleration sensor. Scenario positioning technologies of the GPS device, the indoor positioning sensor, the environmental sensor, the electronic compass, the gyroscope, the altitude sensor, and the acceleration sensor belong to the prior art, and are not described in detail herein.

In this embodiment, information about a scenario in which a device including a rechargeable-battery is located is automatically positioned by using a positioning device; an energy availability level of the device including a rechargeable-battery is determined according to a result of comparing the scenario in which the device including a rechargeable-battery is located with a preset scenario table; and a corresponding energy management policy is generated according to the energy availability level, so that a battery endurance capability is effectively improved.

Figure 7:
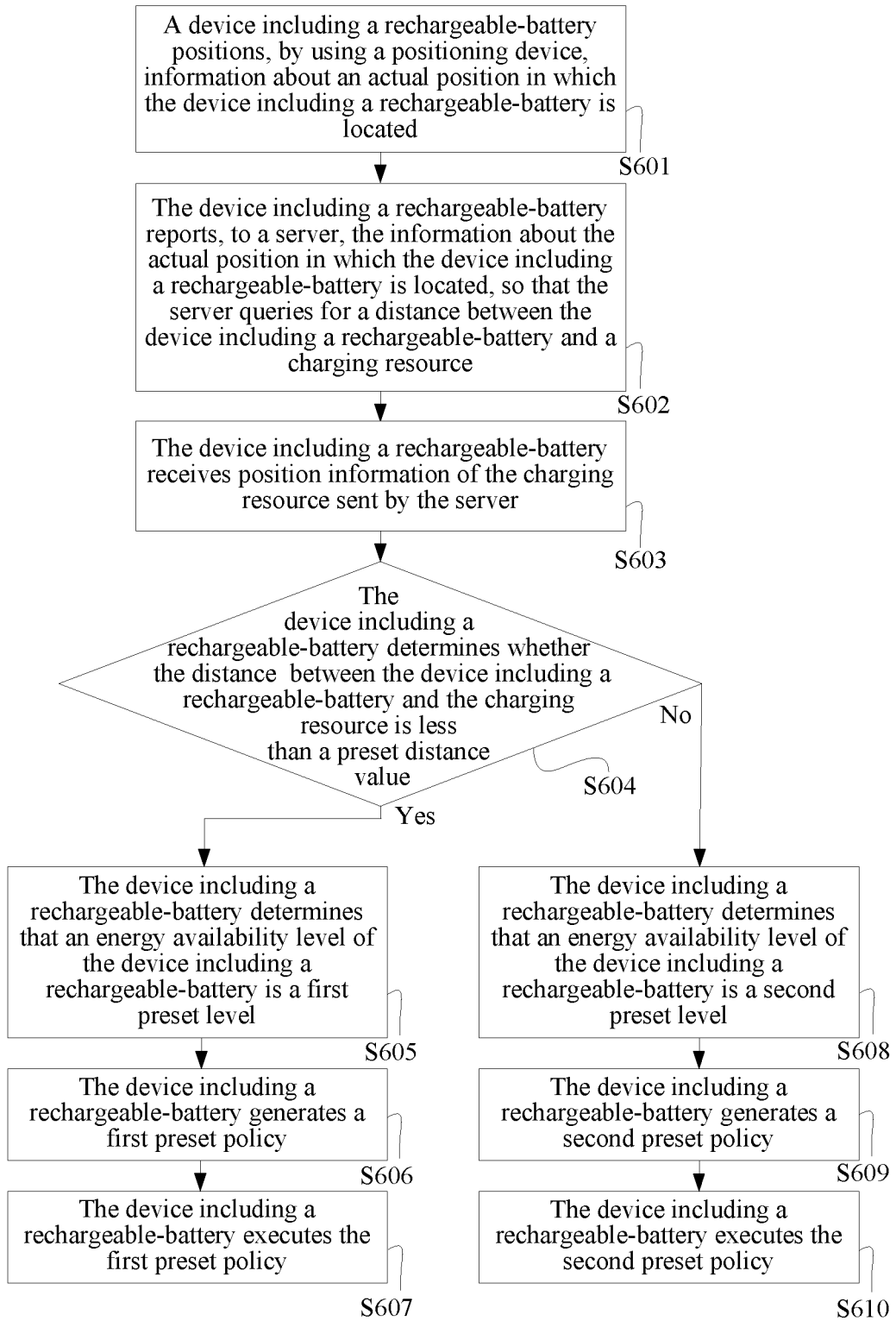
FIG. 7 is a schematic flowchart of a sixth embodiment of an energy management method for a device including a rechargeable-battery according to the present invention.

Further referring to FIG. 7, FIG. 7 is a schematic flowchart of a sixth embodiment of an energy management method for a device including a rechargeable-battery according to the present invention. Step S604, step S605, step S606, step S607, step S608, step S609, and step S610 of the energy management method in FIG. 7 are the same as step S302, step S303, step S304, step S305, step S306, step S307, and step S308 of the energy management method in FIG. 4, and a main difference between the energy management method in FIG. 7 and the energy management method in FIG. 4 lies in:

Step S601: The device including a rechargeable-battery 11 positions, by using a positioning device, information about an actual position in which the device including a rechargeable-battery 11 is located.

The positioning device includes a GPS device, an indoor positioning sensor, an environmental sensor, an electronic compass, a gyroscope, an altitude sensor, and an acceleration sensor. Actual-position positioning technologies of the GPS device, the indoor positioning sensor, the environmental sensor, the electronic compass, the gyroscope, the altitude sensor, and the acceleration sensor belong to the prior art, and are not described in detail herein.

In this embodiment, before step S601 is performed, the scenario in which the device including a rechargeable-battery 11 is located is preferably an outdoor scenario.

Step S602: The device including a rechargeable-battery 11 reports, to a server 10, the information about the actual position in which the device including a rechargeable-battery 11 is located, so that the server 10 queries for a distance between the device including a rechargeable-battery 11 and a charging resource 12.

Step S603: The device including a rechargeable-battery 11 receives position information of the charging resource 12 sent by the server 10.

The position information of the charging resource 12 includes a distance between the device including a rechargeable-battery 11 and the charging resource 12.

In this embodiment, the device including a rechargeable-battery 11 is preferably an electric vehicle. For example, in a scenario in which a user drives an electric vehicle, when the electric vehicle is in an outdoor scenario and a residual electric quantity of the electric vehicle is less than a preset value, the electric vehicle automatically establishes a network connection, positions, by using a positioning device, information about an actual position of the electric vehicle, and sends the information about the actual position of the electric vehicle to the server 10. The server 10 queries for position information of a charging resource 12 that is near the real-time position in which the electric vehicle is located, for example, information such as position information of a nearby charging station within 10 km, vacancy information of a charging location, a charging tariff or charging duration. The information may be all used as an input parameter for analyzing an energy availability level. The electric vehicle automatically performs an evaluation to obtain an energy availability level, and then adjusts an energy management policy according to the energy availability level. If a current residual electric quantity of the electric vehicle driven by the user can support keeping driving for only 10 km, but a closest charging station found by the server 10 is 10.5 km away, energy availability is extremely low, and the electric vehicle has to reduce a current energy consumption level of the electric vehicle, for example, disables an auxiliary function such as turning off a network, a sounder, or an air conditioner, to increase an endurance range of the electric vehicle, so as to ensure that the electric vehicle can be driven to the charging station. If the current residual electric quantity of the electric vehicle driven by the user can support keeping driving for only 10 km, but the server 10 finds that multiple charging stations are 5 km away nearby, the energy availability of the electric vehicle is extremely high, and the electric vehicle may prompt to select a high-performance mode, and imposes no limitation on use of functions such as an entertainment function, a network function, and an air conditioner function.

Further, when the energy availability of the electric vehicle is middle or high, the electric vehicle may set a navigation route, predicts energy consumption of the selected route, and adjusts an energy management policy, where an energy management policy of no limitation may be used for a short distance, and an energy management policy of partial limitations may be used for a long distance, to optimize user experience of driving and ensure that a charging resource is obtained to perform charging.

In this embodiment, a server queries for a distance between a device including a rechargeable-battery and a charging resource; an energy availability level of the device including a rechargeable-battery is determined according to the distance between the device including a rechargeable-battery and the charging resource; and a corresponding energy management policy is generated according to the energy availability level, so that a battery endurance capability is effectively improved.

Figure 8:
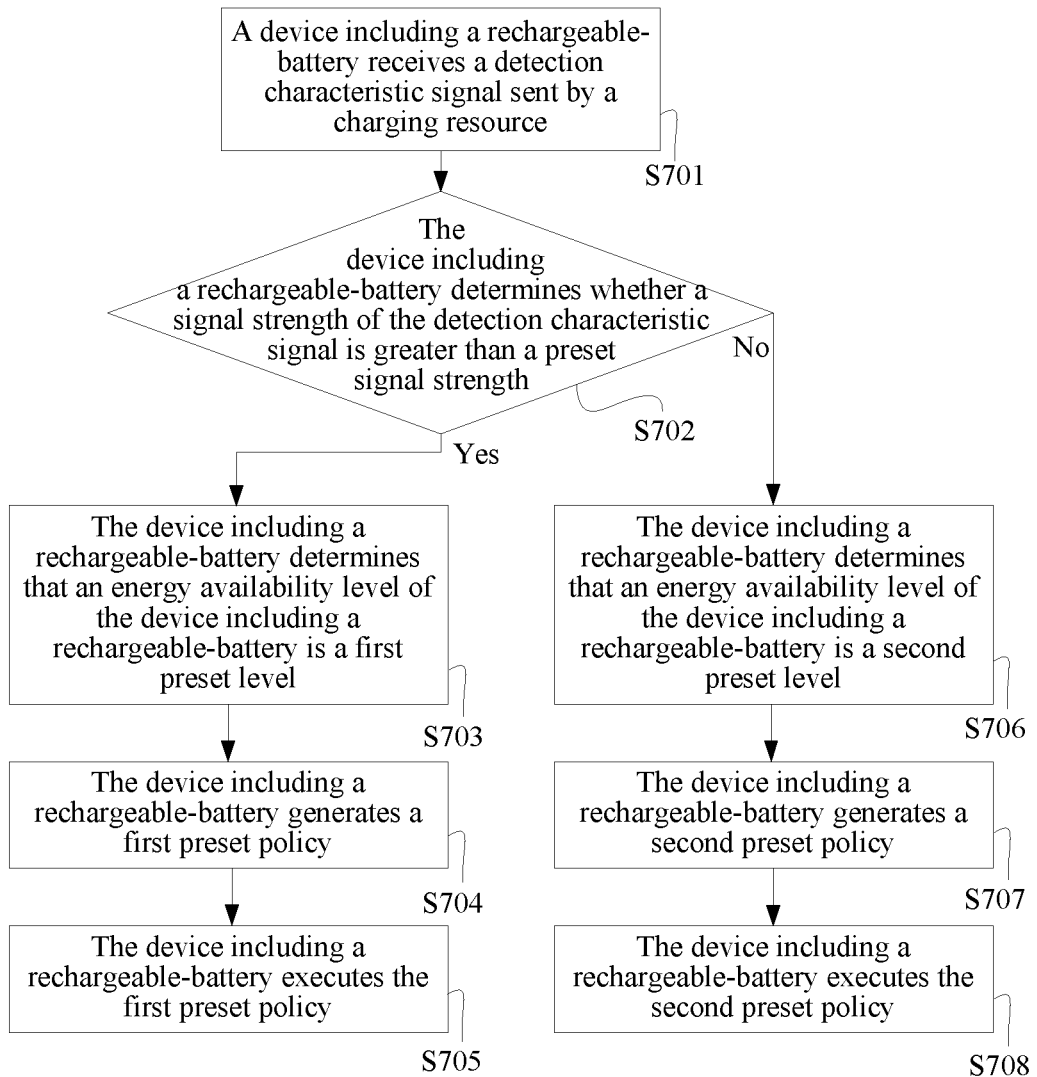
FIG. 8 is a schematic flowchart of a seventh embodiment of an energy management method for a device including a rechargeable-battery according to the present invention.

Further referring to FIG. 8, FIG. 8 is a schematic flowchart of a seventh embodiment of an energy management method for a device including a rechargeable-battery according to the present invention. Step S704, step S705, step S706, step S707, and step S708 of the energy management method in FIG. 8 are the same as step S606, step S607, step S608, step S609, and step S610 of the energy management method in FIG. 7, and a main difference between the energy management method in FIG. 8 and the energy management method in FIG. 7 lies in:

Step S701: The device including a rechargeable-battery 11 receives a detection characteristic signal sent by a charging resource 12.

The device including a rechargeable-battery 11 may determine, by using the detection characteristic signal, whether a wireless charging resource, a fast charging resource, a battery swapping resource, or the like exists. In addition, the device including a rechargeable-battery 11 may further determine, by using the detection characteristic signal, a charging-supported model, charging duration, a charging power strength, charging billing information, or the like provided by the charging resource 12.

In this embodiment, before step S701 is performed, a scenario in which the device including a rechargeable-battery 11 is located is preferably an indoor scenario.

Step S702: The device including a rechargeable-battery 11 determines whether a signal strength of the detection characteristic signal is greater than a preset signal strength.

If the device including a rechargeable-battery 11 determines that the signal strength of the detection characteristic signal is greater than the preset signal strength, it indicates that the device including a rechargeable-battery 11 is very close to the charging resource 12. Therefore, step S703 is performed: The device including a rechargeable-battery 11 determines that an energy availability level of the device including a rechargeable-battery 11 is a first preset level.

If the device including a rechargeable-battery 11 determines that the signal strength of the detection characteristic signal is not greater than the preset signal strength, it indicates that the device including a rechargeable-battery 11 is a little far away from the charging resource 12. Therefore, step S706 is performed: The device including a rechargeable-battery 11 determines that the energy availability level of the device including a rechargeable-battery 11 is a second preset level.

For example, in an indoor scenario of a public place, for example, a user enters a shopping mall, and if the device including a rechargeable-battery 11 determines that the signal strength of the detection characteristic signal is greater than the preset signal strength, it indicates that charging or battery swapping is available for the device including a rechargeable-battery 11 at any time and at any place in the shopping mall, the user can charge the device including a rechargeable-battery 11 at any time and at any place in a particular range, and the user does not need to consider a problem of a low residual electric quantity of the device including a rechargeable-battery 11. In this case, energy availability of the device including a rechargeable-battery 11 is extremely high, and the device including a rechargeable-battery 11 uses a high-performance energy management policy, for example, imposing no limitation on power consumption of functions and programs. If a restaurant or library in which the device including a rechargeable-battery 11 is located does not provide a charging service to the outside, the device including a rechargeable-battery 11 determines that the signal strength of the detection characteristic signal is not greater than the preset signal strength. In this case, it is difficult for the user to charge the device including a rechargeable-battery 11. Therefore, the energy availability of the device including a rechargeable-battery 11 is low, the device including a rechargeable-battery 11 needs to enter a battery saving mode, to limit power consumption of one of or a combination of more than one of some functions or programs.

In this embodiment, a device including a rechargeable-battery automatically receives a detection characteristic signal sent by a charging resource, determines, according to the detection characteristic signal, an energy availability level of the device including a rechargeable-battery, and generates a corresponding energy management policy according to the energy availability level, so that a battery endurance capability is effectively improved.

Figure 9:
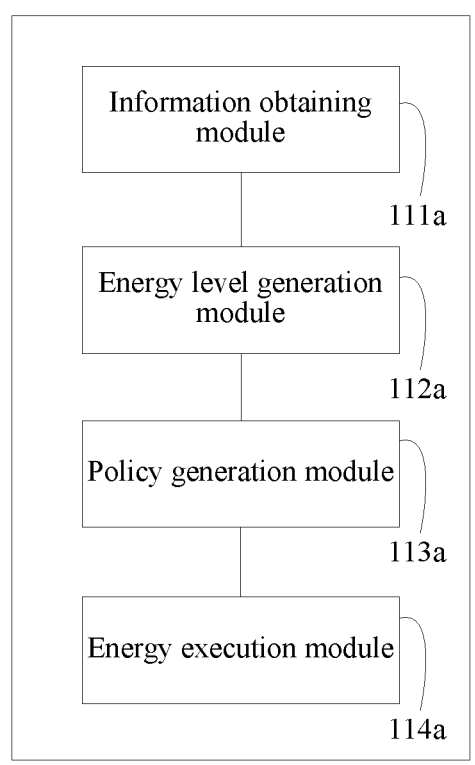
FIG. 9 is a schematic structural diagram of a first embodiment of a device including a rechargeable-battery according to the present invention.

The present invention discloses a device including a rechargeable-battery. As shown in FIG. 9, FIG. 9 is a schematic structural diagram of a first embodiment of a device including a rechargeable-battery according to the present invention. The device including a rechargeable-battery in FIG. 9 corresponds to the energy management method for a device including a rechargeable-battery in FIG. 2. The device including a rechargeable-battery 11 includes an information obtaining module 111a, an energy level generation module 112a, a policy generation module 113a, and an energy execution module 114a.

The information obtaining module 111a is configured to obtain information that is related to energy availability, where the information that is related to energy availability includes information that indicates whether the device including a rechargeable-battery 11 is rechargeable, position information of a charging resource 12, information about a scenario in which the device including a rechargeable-battery 11 is located, or a detection characteristic signal sent by the charging resource 12, and the position information of the charging resource 12 includes a distance between the device including a rechargeable-battery 11 and the charging resource 12.

In this embodiment, the information obtaining module 111a may obtain, at any comment, the information that is related to energy availability. Preferably, the information obtaining module 111a obtains, at an interval, the information that is related to energy availability.

Optionally, before the information obtaining module 111a obtains the information that is related to energy availability, when the device including a rechargeable-battery 11 determines that a residual electric quantity of the device including a rechargeable-battery 11 is less than a preset value, the information obtaining module 111a obtains the information that is related to energy availability.

The energy level generation module 112a is configured to: analyze, according to the information that is related to energy availability, the energy availability of the device including a rechargeable-battery, and determine, according to an analysis result, an energy availability level of the device including a rechargeable-battery 11, where the energy availability is used to measure a probability that the device including a rechargeable-battery 11 obtains a charging opportunity, the energy availability level includes a first preset level and a second preset level, and the first preset level is higher than the second preset level. The energy availability level includes an extremely high energy level, a high energy level, a middle energy level, a low energy level, and an extremely low energy level. The first preset level and the second preset level are separately one of the extremely high energy level, the high energy level, the middle energy level, the low energy level, or the extremely low energy level. It should be understood that, the energy availability level is a level that is set by a user, and the energy availability level may further include a third preset level, a fourth preset level, or more levels.

The policy generation module 113a is configured to generate an energy management policy according to the energy availability level, where the energy management policy includes a first preset policy corresponding to the first preset level and a second preset policy corresponding to the second preset level. In this embodiment, the energy management policy is one of or a combination of more than one of a battery saving mode, a function limitation, or a program limitation, and the first preset policy and the second preset policy are separately one of or a combination of more than one of the battery saving mode, the function limitation, or the program limitation. It should be understood that, the energy management policy is a policy that is set by the user, and the energy management policy may further include a third preset policy, a fourth preset policy, or more policies.

The energy execution module 114a is configured to execute the energy management policy. For the energy management policy and the energy availability level, refer to Table 1.

In this embodiment, information that is related to energy availability can be obtained; energy availability level of the device including a rechargeable-battery can be determined according to the information that is related to energy availability; and a corresponding energy management policy can be generated according to the energy availability level, so that a battery endurance capability is effectively improved.

Figure 10:
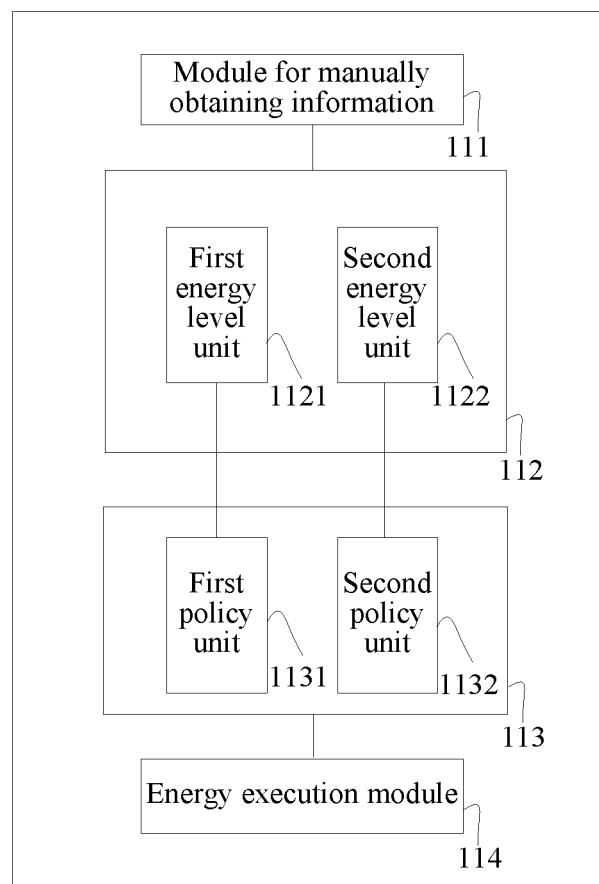
FIG. 10 is a schematic structural diagram of a second embodiment of a device including a rechargeable-battery according to the present invention.

As shown in FIG. 10, FIG. 10 is a schematic structural diagram of a second embodiment of a device including a rechargeable-battery according to the present invention. The device including a rechargeable-battery in FIG. 10 corresponds to the energy management method for a device including a rechargeable-battery in FIG. 3. A main difference between the device including a rechargeable-battery in FIG. 10 and the device including a rechargeable-battery in FIG. 9 lies in:

An information obtaining module 111a includes a module for manually obtaining information 111, where the module for manually obtaining information 111 is configured to obtain information that indicates whether the device including a rechargeable-battery 11 is rechargeable and that is manually entered by a user into the device including a rechargeable-battery 11.

Optionally, before the module for manually obtaining information 111 obtains the information that indicates whether the device including a rechargeable-battery 11 is rechargeable and that is manually entered by the user into the device including a rechargeable-battery 11, when the device including a rechargeable-battery 11 determines that a residual electric quantity of the device including a rechargeable-battery 11 is less than a preset value, the device including a rechargeable-battery 11 automatically prompts the user to directly enter the information that indicates whether the device including a rechargeable-battery 11 is rechargeable, where the information is mainly used to determine whether the current device including a rechargeable-battery 11 is rechargeable.

An energy level generation module 112 includes a first energy level unit 1121 and a second energy level unit 1122. The first energy level unit 1121 is configured to: when the device including a rechargeable-battery 11 indicates that the device including a rechargeable-battery 11 is rechargeable, determine that an energy availability level of the device including a rechargeable-battery 11 is a first preset level. The second energy level unit 1122 is configured to: when the device including a rechargeable-battery 11 indicates that the device including a rechargeable-battery 11 is non-rechargeable, determine that the energy availability level of the device including a rechargeable-battery 11 is a second preset level.

A policy generation module 113 includes a first policy unit 1131 and a second policy unit 1132. The first policy unit 1131 is configured to: when the energy availability level of the device including a rechargeable-battery 11 is the first preset level, generate a first preset policy. The second policy unit 1132 is configured to: when the energy availability level of the device including a rechargeable-battery 11 is the second preset level, generate a second preset policy.

In this embodiment, information that indicates whether the device including a rechargeable-battery is rechargeable is manually entered; an energy availability level of the device including a rechargeable-battery is determined according to whether the current device including a rechargeable-battery is rechargeable; and a corresponding energy management policy is generated according to the energy availability level, so that a battery endurance capability is effectively improved.

Figure 11:
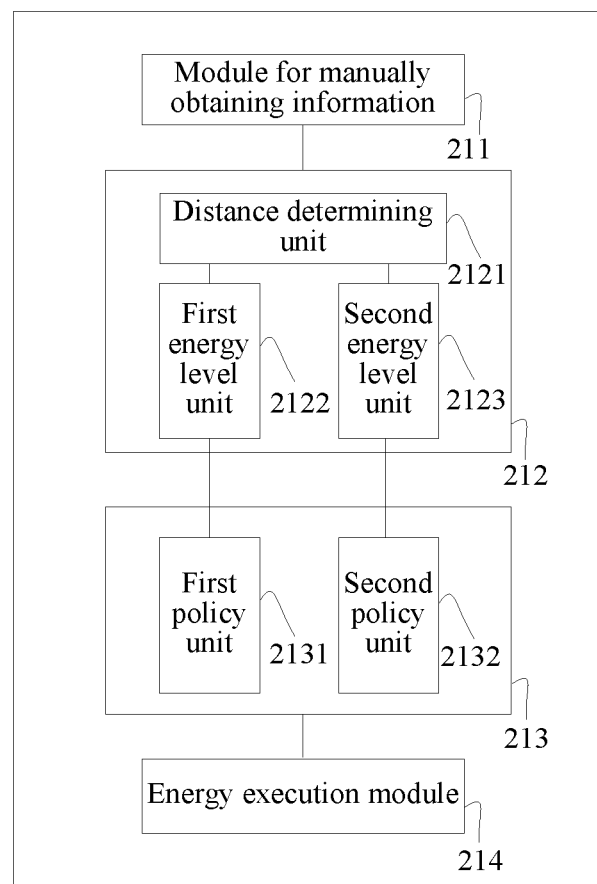
FIG. 11 is a schematic structural diagram of a third embodiment of a device including a rechargeable-battery according to the present invention.

As shown in FIG. 11, FIG. 11 is a schematic structural diagram of a third embodiment of a device including a rechargeable-battery according to the present invention. The device including a rechargeable-battery in FIG. 11 corresponds to the device including a rechargeable-battery in FIG. 4. A main difference between the device including a rechargeable-battery in FIG. 11 and the device including a rechargeable-battery in FIG. 10 lies in:

A module for manually obtaining information 211 is configured to obtain position information of a charging resource 12 manually entered by a user into the device including a rechargeable-battery 11. The position information of the charging resource 12 includes a distance between the device including a rechargeable-battery 11 and the charging resource 12.

An energy level generation module 212 includes a distance determining unit 21211, a first energy level unit 2122, and a second energy level unit 2123. The distance determining unit 2121 is configured to determine whether the distance between the device including a rechargeable-battery 11 and the charging resource 12 is less than a preset distance value. The first energy level unit 2122 is configured to: when the distance determining unit 2121 determines that the distance between the device including a rechargeable-battery 11 and the charging resource 12 is less than the preset distance value, determine that an energy availability level of the device including a rechargeable-battery 11 is a first preset level. The second energy level unit 2123 is configured to: when the distance determining unit 2121 determines that the distance between the device including a rechargeable-battery 11 and the charging resource 12 is not less than the preset distance value, determine that the energy availability level of the device including a rechargeable-battery 11 is a second preset level.

In this embodiment, a distance between the device including a rechargeable-battery and a charging resource is manually entered; an energy availability level of the device including a rechargeable-battery is determined according to the distance between the device including a rechargeable-battery and the charging resource; and a corresponding energy management policy is generated according to the energy availability level, so that a battery endurance capability is effectively improved.

Figure 12:
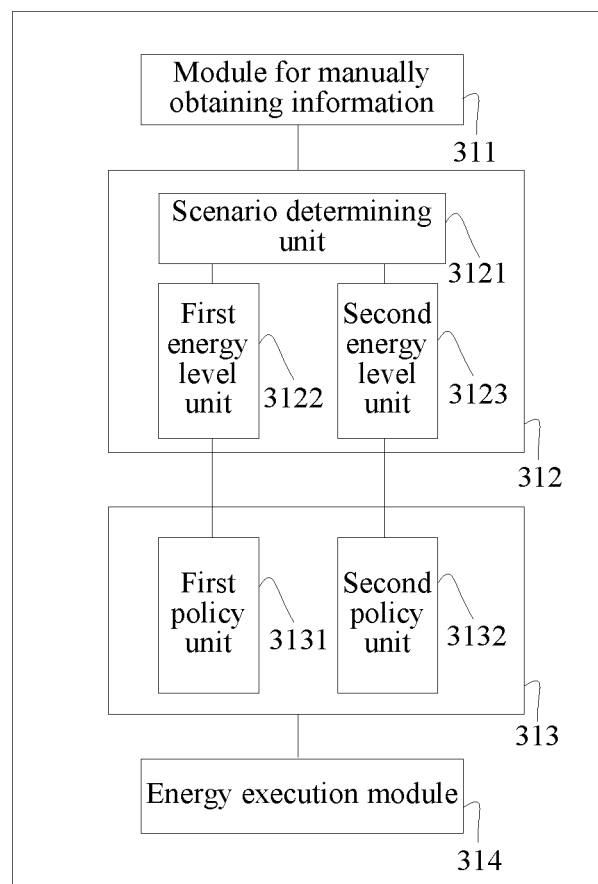
FIG. 12 is a schematic structural diagram of a fourth embodiment of a device including a rechargeable-battery according to the present invention.

As shown in FIG. 12, FIG. 12 is a schematic structural diagram of a fourth embodiment of a device including a rechargeable-battery according to the present invention. The device including a rechargeable-battery in FIG. 12 corresponds to the device including a rechargeable-battery in FIG. 5. A main difference between the device including a rechargeable-battery in FIG. 12 and the device including a rechargeable-battery in FIG. 10 lies in:

A module for manually obtaining information 311 is configured to obtain information that is about a scenario in which the device including a rechargeable-battery 11 is located and that is manually entered by a user into the device including a rechargeable-battery 11.

An energy level generation module 312 includes a scenario determining unit 3121, a first energy level unit 3122, and a second energy level unit 3123. The scenario determining unit 3121 is configured to compare the scenario in which the device including a rechargeable-battery 11 is located with a preset scenario table, where the preset scenario table includes a first preset scenario and a second preset scenario. The first energy level unit 3122 is configured to: when the scenario determining unit 3121 determines that the scenario in which the device including a rechargeable-battery 11 is located is the first preset scenario, determine that an energy availability level of the device including a rechargeable-battery 11 is a first preset level. The second energy level unit 3123 is configured to: when the scenario determining unit 3121 determines that the scenario in which the device including a rechargeable-battery 11 is located is the second preset scenario, determine that the energy availability level of the device including a rechargeable-battery 11 is a second preset level.

In this embodiment, the preset scenario table includes a home scenario, an office scenario, a shopping mall scenario, a restaurant scenario, a driving scenario, a bus scenario, an outdoor scenario, a wild scenario, and the like. The first preset scenario and the second preset scenario are separately one of the home scenario, the office scenario, the shopping mall scenario, the restaurant scenario, the driving scenario, the bus scenario, the outdoor scenario, or the wild scenario, and each scenario corresponds to a different energy availability level. For details, refer to Table 2. It should be understood that, the preset scenario table is set by the user, and may further include a third preset scenario, a fourth preset scenario, or more preset scenarios.

In this embodiment, information about a scenario in which the device including a rechargeable-battery is located is manually entered; an energy availability level of the device including a rechargeable-battery is determined according to a result of comparing the scenario in which the device including a rechargeable-battery is located with a preset scenario table; and a corresponding energy management policy is generated according to the energy availability level, so that a battery endurance capability is effectively improved.

Figure 13:
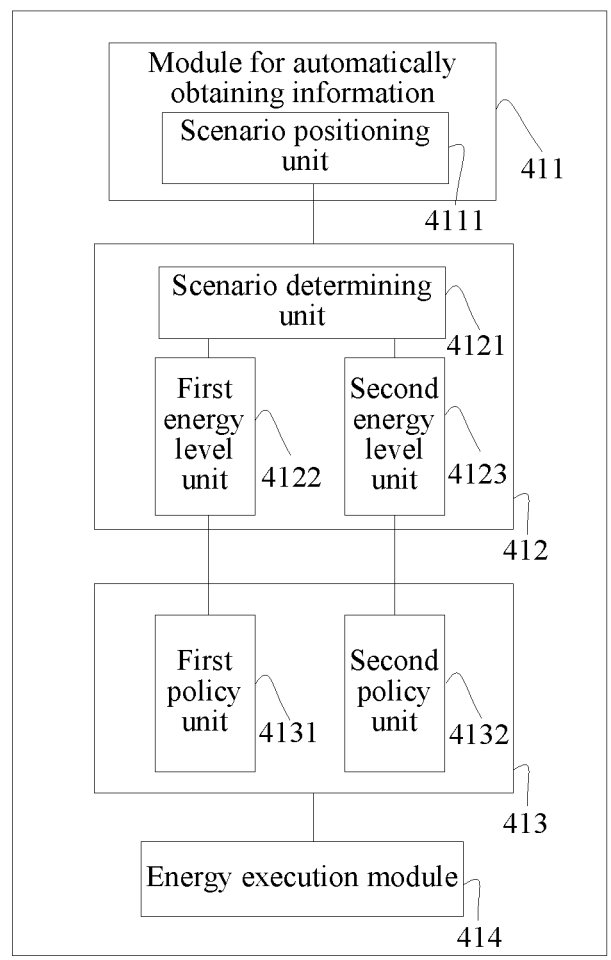
FIG. 13 is a schematic structural diagram of a fifth embodiment of a device including a rechargeable-battery according to the present invention.

As shown in FIG. 13, FIG. 13 is a schematic structural diagram of a fifth embodiment of a device including a rechargeable-battery according to the present invention. The device including a rechargeable-battery in FIG. 13 corresponds to the device including a rechargeable-battery in FIG. 6. A main difference between the device including a rechargeable-battery in FIG. 13 and the device including a rechargeable-battery in FIG. 12 lies in:

An information obtaining module 111a includes a module for automatically obtaining information 411, and the module for automatically obtaining information 411 includes a scenario positioning unit 4111. The scenario positioning unit 4111 is configured to position, by using a positioning device, information about a scenario in which the device including a rechargeable-battery 11 is located, where the positioning device includes a GPS device, an indoor positioning sensor, or an environmental sensor.

The positioning device includes a GPS device, an indoor positioning sensor, an environmental sensor, an electronic compass, a gyroscope, an altitude sensor, and an acceleration sensor. Scenario positioning technologies of the GPS device, the indoor positioning sensor, the environmental sensor, the electronic compass, the gyroscope, the altitude sensor, and the acceleration sensor belong to the prior art, and are not described in detail herein.

In this embodiment, information about a scenario in which the device including a rechargeable-battery is located is automatically positioned by using a positioning device; an energy availability level of the device including a rechargeable-battery is determined according to a result of comparing the scenario in which the device including a rechargeable-battery is located with a preset scenario table; and a corresponding energy management policy is generated according to the energy availability level, so that a battery endurance capability is effectively improved.

Figure 14:
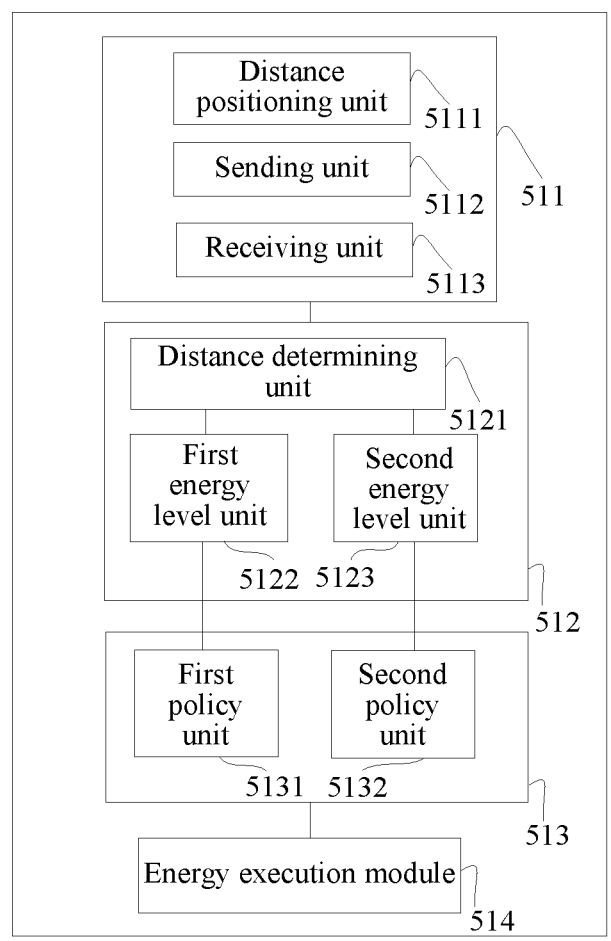
FIG. 14 is a schematic structural diagram of a sixth embodiment of a device including a rechargeable-battery according to the present invention.

As shown in FIG. 14, FIG. 14 is a schematic structural diagram of a sixth embodiment of a device including a rechargeable-battery according to the present invention. The device including a rechargeable-battery in FIG. 14 corresponds to the device including a rechargeable-battery in FIG. 7. A main difference between the device including a rechargeable-battery in FIG. 14 and the device including a rechargeable-battery in FIG. 11 lies in:

An information obtaining module 111a includes a module for automatically obtaining information 511, and the module for automatically obtaining information 511 includes a distance positioning unit 5111, a sending unit 5112, and a receiving unit 5113. The distance positioning unit 5111 is configured to position, by using a positioning device, information about an actual position in which the device including a rechargeable-battery 11 is located, where the positioning device includes a GPS device, an indoor positioning sensor, an environmental sensor, an electronic compass, a gyroscope, an altitude sensor, and an acceleration sensor. The sending unit 5112 is configured to report, to a server 10, the information about the actual position in which the device including a rechargeable-battery 11 is located, so that the server 10 queries for a distance between the device including a rechargeable-battery 11 and the charging resource 12. The receiving unit 5113 is configured to receive position information of the charging resource 12 sent by the server 10, where the position information of the charging resource 12 includes the distance between the device including a rechargeable-battery 11 and the charging resource 12.

In this embodiment, a server queries for a distance between the device including a rechargeable-battery and a charging resource; an energy availability level of the device including a rechargeable-battery is determined according to the distance between the device including a rechargeable-battery and the charging resource; and a corresponding energy management policy is generated according to the energy availability level, so that a battery endurance capability is effectively improved.

Figure 15:
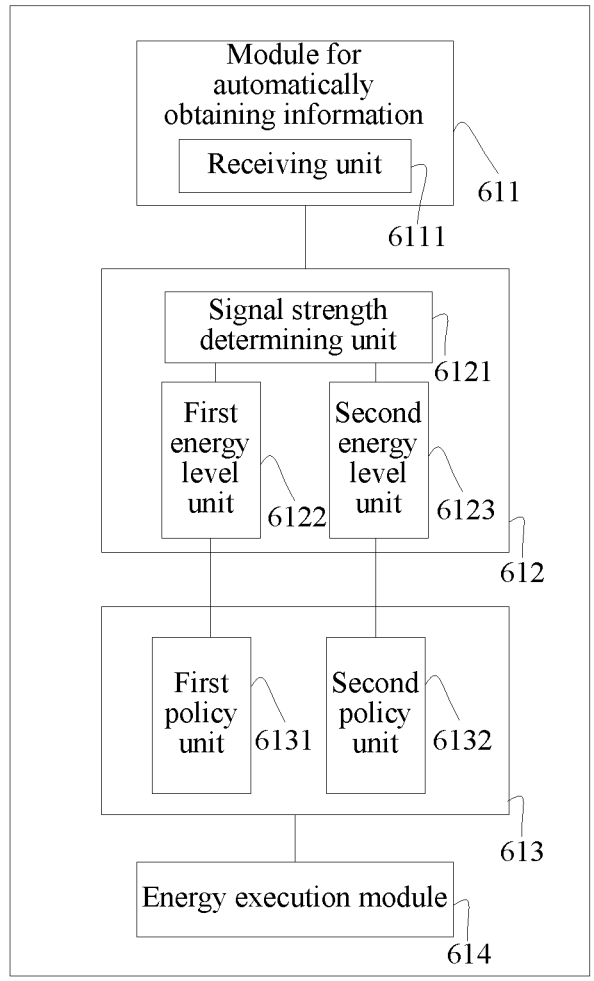
FIG. 15 is a schematic structural diagram of a seventh embodiment of a device including a rechargeable-battery according to the present invention.

As shown in FIG. 15, FIG. 15 is a schematic structural diagram of a seventh embodiment of a device including a rechargeable-battery according to the present invention. The device including a rechargeable-battery in FIG. 15 corresponds to the device including a rechargeable-battery in FIG. 8. A main difference between the device including a rechargeable-battery in FIG. 15 and the device including a rechargeable-battery in FIG. 14 lies in:

The information obtaining module 111a includes a module for automatically obtaining information 611, and the module for automatically obtaining information 611 includes a receiving unit 6111. The receiving unit 6111 is configured to receive a detection characteristic signal sent by a charging resource 12. The device including a rechargeable-battery 11 may determine, by using the detection characteristic signal, whether a wireless charging resource, a fast charging resource, a battery swapping resource, or the like exists. In addition, the device including a rechargeable-battery 11 may further determine, by using the detection characteristic signal, a charging-supported model, charging duration, a charging power strength, charging billing information, or the like provided by the charging resource 12.

An energy level generation module 612 includes a signal strength determining unit 6121, a first energy level unit 6122, and a second energy level unit 6123. The signal strength determining unit 6121 is configured to determine whether a signal strength of the detection characteristic signal is greater than a preset signal strength. The first energy level unit 6122 is configured to: when the signal strength determining unit 6121 determines that the signal strength of the detection characteristic signal is greater than the preset signal strength, determine that an energy availability level of the device including a rechargeable-battery 11 is a first preset level. The second energy level unit 6123 is configured to: when the signal strength determining unit 6121 determines that the signal strength of the detection characteristic signal is not greater than the preset signal strength, determine that the energy availability level of the device including a rechargeable-battery 11 is a second preset level.

In this embodiment, the device including a rechargeable-battery automatically receives a detection characteristic signal sent by a charging resource, determines, according to the detection characteristic signal, an energy availability level of the device including a rechargeable-battery, and generates a corresponding energy management policy according to the energy availability level, so that a battery endurance capability is effectively improved.

Figure 16:
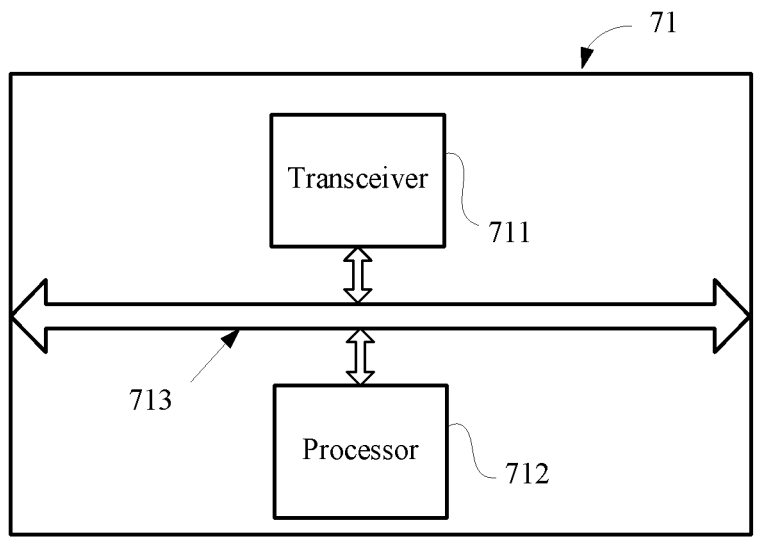
FIG. 16 is a schematic structural diagram of an eighth embodiment of a device including a rechargeable-battery according to the present invention.

As shown in FIG. 16, FIG. 16 is a schematic structural diagram of an eighth embodiment of a device including a rechargeable-battery according to the present invention. The device including a rechargeable-battery 11 includes a transceiver 711 and a processor 712. The transceiver 711 and the processor 712 are connected by using a bus 713.

The transceiver 711 is configured to obtain information that is related to energy availability and that is entered by a user into the device including a rechargeable-battery 11, where the information that is related to energy availability includes information that indicates whether the device including a rechargeable-battery 11 is rechargeable, position information of a charging resource 12, or information about a scenario in which the device including a rechargeable-battery 11 is located, and the position information of the charging resource includes a distance between the device including a rechargeable-battery 11 and the charging resource.

The processor 712 is configured to: analyze, according to the information that is related to energy availability, the energy availability of the device including a rechargeable-battery 11, and determine, according to an analysis result, an energy availability level of the device including a rechargeable-battery 11, where the energy availability level includes a first preset level and a second preset level.

The processor 712 is configured to generate an energy management policy according to the energy availability level, where the energy management policy includes a first preset policy and a second preset policy.

The processor 712 is configured to execute the energy management policy.

Specifically, when the transceiver 711 obtains the information that indicates whether the device including a rechargeable-battery 11 is rechargeable and that is manually entered by the user into the device including a rechargeable-battery 11, if the processor 712 determines that the device including a rechargeable-battery 11 is rechargeable, the processor 712 determines that the energy availability level of the device including a rechargeable-battery 11 is the first preset level, and the processor 712 generates the first preset policy and executes the first preset policy. If the processor 712 determines that the device including a rechargeable-battery 11 is non-rechargeable, the processor 712 determines that the energy availability level of the device including a rechargeable-battery 11 is the second preset level, and the processor 712 generates the second preset policy and executes the second preset policy.

When the transceiver 711 obtains the position information of the charging resource manually entered by the user into the device including a rechargeable-battery 11, the processor 712 determines whether the distance between the device including a rechargeable-battery 11 and the charging resource 12 is less than a preset distance value. If the processor 712 determines that the distance between the device including a rechargeable-battery 11 and the charging resource 12 is less than the preset distance value, the processor 712 determines that the energy availability level of the device including a rechargeable-battery 11 is the first preset level, and the processor 712 generates the first preset policy and executes the first preset policy. If the processor 712 determines that the distance between the device including a rechargeable-battery 11 and the charging resource 12 is not less than the preset distance value, the processor 712 determines that the energy availability level of the device including a rechargeable-battery 11 is the second preset level, and the processor 712 generates the second preset policy and executes the second preset policy.

When the transceiver 711 obtains the information that is about the scenario in which the device including a rechargeable-battery 11 is located and that is manually entered by the user into the device including a rechargeable-battery 11, the processor 712 compares the scenario in which the device including a rechargeable-battery 11 is located with a preset scenario table, where the preset scenario table includes a first preset scenario and a second preset scenario. If the processor 712 determines that the scenario in which the device including a rechargeable-battery 11 is located is the first preset scenario, the processor 712 determines that the energy availability level of the device including a rechargeable-battery 11 is the first preset level, and the processor 712 generates the first preset policy and executes the first preset policy. If the processor 712 determines that the scenario in which the device including a rechargeable-battery 11 is located is the second preset scenario, the processor 712 determines that the energy availability level of the device including a rechargeable-battery 11 is the second preset level, and the processor 712 generates the second preset policy and executes the second preset policy.

Further, the transceiver 711 is further configured to automatically obtain the information that is related to energy availability, where the information that is related to energy availability includes information about a scenario in which the device including a rechargeable-battery 11 is located, and position information of a charging resource 12 or a detection characteristic signal sent by the charging resource 12, where the position information of the charging resource 12 includes a distance between the device including a rechargeable-battery 11 and the charging resource 12.

Specifically, when the transceiver 711 positions, by using a positioning device, the information about the scenario in which the device including a rechargeable-battery 11 is located, the processor 712 compares the scenario in which the device including a rechargeable-battery 11 is located with a preset scenario table, where the preset scenario table includes a first preset scenario and a second preset scenario. If the processor 712 determines that the scenario in which the device including a rechargeable-battery 11 is located is the first preset scenario, the processor 712 determines that energy availability level of the device including a rechargeable-battery 11 is a first preset level, and the processor 712 generates a first preset policy and executes the first preset policy. If the processor 712 determines that the scenario in which the device including a rechargeable-battery 11 is located is the second preset scenario, the processor 712 determines that the energy availability level of the device including a rechargeable-battery 11 is a second preset level, and the processor 712 generates a second preset policy and executes the second preset policy.

When the transceiver 711 positions, by using a positioning device, information about an actual position in which the device including a rechargeable-battery 11 is located, the transceiver 711 reports, to a server 10, the information about the actual position in which the device including a rechargeable-battery 11 is located, so that the server 10 queries for the distance between the device including a rechargeable-battery 11 and the charging resource 12. The transceiver 711 receives the position information of the charging resource 12 sent by the server 10, where the position information of the charging resource includes the distance between the device including a rechargeable-battery 11 and the charging resource 12. The processor 712 determines whether the distance between the device including a rechargeable-battery 11 and the charging resource 12 is less than a preset distance value. If the processor 712 determines that the distance between the device including a rechargeable-battery 11 and the charging resource 12 is less than the preset distance value, the processor 712 determines that energy availability level of the device including a rechargeable-battery 11 is a first preset level, and the processor 712 generates a first preset policy and executes the first preset policy. If the processor 712 determines that the distance between the device including a rechargeable-battery 11 and the charging resource 12 is not less than the preset distance value, the processor 712 determines that the energy availability level of the device including a rechargeable-battery 11 is a first preset level, and the processor 712 generates a first preset policy and executes the first preset policy.

When the transceiver 711 receives the detection characteristic signal sent by the charging resource 12, the processor 712 determines whether a signal strength of the detection characteristic signal is greater than a preset signal strength. If the processor 712 determines that the signal strength of the detection characteristic signal is greater than the preset signal strength, the processor 712 determines that energy availability level of the device including a rechargeable-battery 11 is a first preset level, and the processor 712 generates a first preset policy and executes the first preset policy. If the processor 712 determines that the signal strength of the detection characteristic signal is not greater than the preset signal strength, the processor 712 determines that the energy availability level of the device including a rechargeable-battery 11 is a second preset level, and the processor 712 generates a second preset policy and executes the second preset policy.

In this embodiment, the transceiver can obtain information that is related to energy availability; and the processor can determine, according to the information that is related to energy availability, energy availability level of the device including a rechargeable-battery, and generate a corresponding energy management policy according to the energy availability level, so that a battery endurance capability is effectively improved.

The foregoing descriptions are merely embodiments of the present invention, and are not intended to limit the scope of the present invention. An equivalent structural or equivalent process alternation made by using the content of the specification and drawings of the present invention, or an application of the content of the specification and drawings directly or indirectly to another related technical field, shall fall within the protection scope of the present invention.

What is claimed is:

1. An energy management method for a device comprising a rechargeable battery, wherein the energy management method comprises:
   obtaining, by the device, first information that relates to energy availability, wherein the first information comprises second information that indicates whether the device is rechargeable, position information of a charging resource, scenario information in which the device is located, or a detection characteristic signal from the charging resource, and wherein the position information of the charging resource comprises a distance between the device and the charging resource;
   analyzing, by the device according to the first information, a first energy availability of the device;
   determining, according to an analysis result, an energy availability level of the device, wherein the first energy availability is used to measure a probability that the device obtains a charging opportunity, and wherein the energy availability level comprises a first preset level and a second preset level;
   generating, by the device, an energy management policy according to the energy availability level, wherein the energy management policy comprises a first preset policy that corresponds to the first preset level and a second preset policy that corresponds to the second preset level; and
   executing, by the device using the first preset policy or the second preset policy, the energy management policy so as to permit the device to improve a battery endurance of the rechargeable battery.

2. The energy management method of claim 1, wherein obtaining the first information comprises obtaining, by the device, the first information that is manually entered by a user into the device.

3. The energy management method of claim 2, wherein analyzing the energy availability of the device and determining the energy availability level of the device comprises:
   determining whether the device indicates that the device is rechargeable; and
   determining, by the device, that the energy availability level of the device is the first preset level in response to an indication the device is rechargeable or that the energy availability level of the device is the second preset level in response to the indication the device is not rechargeable.

4. The energy management method of claim 2, wherein analyzing the first energy availability of the device and determining the energy availability level of the device comprises:
   determining, by the device, whether the distance between the device and the charging resource is less than a preset distance value; and
   determining, by the device, that the energy availability level of the device is the first preset level in response to the distance being less than the preset distance value or the energy availability level of the device is the second preset level in response to the distance not being less than the preset distance value.

5. The energy management method of claim 2, wherein analyzing the energy availability of the device and determining the energy availability level of the device comprises:
   comparing, by the device, a scenario in which the device is located with a preset scenario table, wherein the preset scenario table comprises a first preset scenario and a second preset scenario;
   determining, by the device, whether the scenario is from the first preset scenario or the second preset scenario; and
   determining, by the device, that the energy availability level of the device is the first preset level in response to the scenario being the first preset scenario or the energy availability level of the device the second preset level in response to the scenario being the second preset scenario.

6. The energy management method of claim 1, wherein obtaining the first information comprises automatically obtaining, by the device, the first information.

7. The energy management method of claim 6, wherein automatically obtaining the first information comprises:
   positioning, by the device using a positioning device, the scenario information in which the device is located, wherein the positioning device comprises a GPS device, an indoor positioning sensor, or an environmental sensor;
   analyzing, by the device according to the first information, the first energy availability of the device and determining the energy availability level of the device comprising:
   comparing, by the device, a scenario in which the device is located with a preset scenario table, wherein the preset scenario table comprises a first preset scenario and a second preset scenario;
   determining, by the device, whether the scenario is from the first preset scenario or the second preset scenario; and
   determining, by the device, that the energy availability level of the device is the first preset level in response to the scenario being the first preset scenario or the energy availability level of the device is the second preset level in response to the scenario being the second preset scenario.

8. The energy management method of claim 6, wherein automatically obtaining the first information comprises:
   positioning, by the device using a positioning device, third information about an actual position in which the device is located, wherein the positioning device comprises a GPS device, an indoor positioning sensor, or an environmental sensor;

reporting, by the device to a server, the third information to enable the server to query the distance between the device and the charging resource;

receiving, by the device from the server, the position information of the charging resource, wherein the position information of the charging resource comprises the distance between the device and the charging resource;

analyzing, by the device according to the first information, the first energy availability of the device; and determining the energy availability level of the device comprising:

determining, by the device, whether the distance between the device and the charging resource is less than a preset distance value; and determining, by the device the energy availability level of the device is the first preset level in response to the distance being less the preset distance value or the energy availability level of the device is the second preset level in response to the distance being not less the preset distance value.

9. The energy management method of claim 6, wherein automatically obtaining the first information comprises:

receiving, by the device, the detection characteristic signal from the charging resource;

analyzing, by the device according to the first information, the first energy availability of the device; and determining the energy availability level of the device comprising:

determining, by the device, whether a signal strength of the detection characteristic signal is greater than a preset signal strength; and determining, by the device, the energy availability level of the device is the first preset level in response to the signal strength being greater than the preset signal strength or the energy availability level of the device is the second preset level in response to the signal strength not being greater than the preset signal strength.

10. A device including a rechargeable-battery, comprising:

a transceiver configured to obtain first information that relates to energy availability, wherein the first information comprises second information that indicates whether the device is rechargeable, position information of a charging resource, scenario information in which the device is located, or a detection characteristic signal from the charging resource, and wherein the position information of the charging resource comprises a distance between the device and the charging resource;

a processor coupled to the transceiver and configured to:

analyze, according to the first information, a first energy availability of the device;

determine, according to an analysis result, an energy availability level of the device, wherein the first energy availability is used to measure a probability that the device obtains a charging opportunity, and wherein the energy availability level comprises a first preset level and a second preset level;

generate an energy management policy according to the energy availability level, wherein the energy management policy comprises a first preset policy that corresponds to the first preset level and a second preset policy that corresponds to the second preset level; and execute, using the first preset policy or the second preset policy, the energy management policy so as to permit the device to improve a battery endurance of the rechargeable battery.

11. The device of claim 10, wherein the transceiver is configured to manually obtain the first information that is manually entered by a user into the device.

12. The device of claim 11, wherein the processor is further configured to:

determine whether the device indicates a rechargeable device or a non-rechargeable device; and determine that the energy availability level of the device is the first preset level in response to an indication the device is rechargeable or the energy availability level of the device is the second preset level in response to the indication the device is not rechargeable.

13. The device of claim 11, wherein the processor is further configured to:

determine whether the distance between the device and the charging resource is less than a preset distance value; and determine that the energy availability level of the device is the first preset level in response to the distance being less than the preset distance value or the energy availability level of the device is the second preset level in response to the distance not being less than the preset distance value.

14. The device of claim 11, wherein the processor is further configured to:

compare a scenario in which the device is located with a preset scenario table, wherein the preset scenario table comprises a first preset scenario and a second preset scenario;

determine whether the scenario is from the first preset scenario or the second preset scenario; and determine that the energy availability level of the device is the first preset level in response to the scenario being the first preset scenario or the energy availability level of the device is the second preset level in response to the scenario being the second preset scenario.

15. The device of claim 10, wherein the transceiver is further configured to automatically obtain the first information.

16. The device of claim 15, further comprising a positioning device coupled to the transceiver and the processor, wherein the positioning device comprises a GPS device, an indoor positioning sensor, or an environmental sensor, and wherein the transceiver is further configured to position, using the positioning device, the scenario information in which the device is located, and wherein the processor is further configured to:

compare the scenario information in which the device is located with a preset scenario table, wherein the preset scenario table comprises a first preset scenario and a second preset scenario;

determine that the energy availability level of the device is the first preset level in response to the scenario information being the first preset scenario or the energy availability level of the device is the second preset level in response to the scenario being the second preset scenario.

17. The device of claim 15, further comprising a positioning device coupled to the transceiver and the processor, wherein the positioning device comprises a GPS device, an indoor positioning sensor, or an environmental sensor, and wherein the transceiver is further configured to:

position, using the positioning device, third information about an actual position in which the device is located;
report, to a server, the third information to enable the server to query the distance between the device and the charging resource; and
receive the position information of the charging resource from the server, wherein the position information of the charging resource comprises the distance between the device and the charging resource, and wherein the processor is further configured to:
determine whether the distance between the device and the charging resource is less than a preset distance value; and
determine that the energy availability level of the device is the first preset level in response to the distance being less the preset distance value or the energy availability level of the device is the second preset level in response to the distance being not less the preset distance value.

18. The device of claim 15, wherein the transceiver is further configured to receive the detection characteristic signal from the charging resource, and wherein the processor is further configured to:
determine whether a signal strength of the detection characteristic signal is greater than a preset signal strength; and
determine that the energy availability level of the device is the first preset level in response to the signal strength being greater than the preset signal strength or that the energy availability level of the device is the second preset level in response to the signal strength not being greater than the preset signal strength.

19. A device comprising a rechargeable-battery, wherein the device comprises:
a transceiver, wherein the transceiver is configured to obtain first information that relates to energy availability, wherein the first information comprises second information that indicates whether the device is rechargeable, position information of a charging resource, scenario information in which the device is located, or a detection characteristic signal from the charging resource, and wherein the position information of the charging resource comprises a distance between the device and the charging resource;
a processor coupled to the transceiver and configured to:
analyze, according to the first information, a first energy availability of the device;
determine, according to an analysis result, an energy availability level of the device, wherein the first energy availability is used to measure a probability that the device obtains a charging opportunity, and wherein the energy availability level comprises a first preset level and a second preset level;
generate an energy management policy according to the energy availability level, wherein the energy management policy comprises a first preset policy that corresponds to the first preset level and a second preset policy that corresponds to the second preset level; and
execute, using the first preset policy or the second preset policy, the energy management policy so as to permit the device to improve a battery endurance of the rechargeable battery.

20. The device of claim 19, wherein the transceiver is configured to obtain the first information that is manually entered by a user into the device.

21. The device of claim 20, wherein the processor is further configured to:
determine whether the device indicates a rechargeable device or a non-rechargeable device; and
determine that the energy availability level of the device is the first preset level in response to an indication the device is rechargeable or the energy availability level of the device is the second preset level in response to the indication the device is not rechargeable.

22. The device of claim 20, wherein the processor is further configured to:
determine whether the distance between the device and the charging resource is less than a preset distance value; and
determine that the energy availability level of the device is the first preset level in response to the distance being less than the preset distance value or the energy availability level of the device is the second preset level in response to the distance not being less than the preset distance value.

23. The device of claim 20, wherein the processor is further configured to:
compare a scenario in which the device is located with a preset scenario table, wherein the preset scenario table comprises a first preset scenario and a second preset scenario;
determine whether the scenario is from the first preset scenario or the second preset scenario; and
determine that the energy availability level of the device is the first preset level in response to the scenario being the first preset scenario or the energy availability level of the device is the second preset level in response to the scenario being the second preset scenario.

24. The device of claim 19, wherein the transceiver is further configured to automatically obtain the first information.

25. The device of claim 24, further comprising a positioning device coupled to the transceiver and the processor, wherein the positioning device comprises a GPS device, an indoor positioning sensor, or an environmental sensor, and wherein the transceiver is further configured to position, using the positioning device, the scenario information in which the device is located, and wherein the processor is further configured to:
compare the scenario information in which the device is located with a preset scenario table, wherein the preset scenario table comprises a first preset scenario and a second preset scenario; and
determine that the energy availability level of the device is the first preset level in response to the scenario information being the first preset scenario or the energy availability level of the device is the second preset level in response to the scenario being the second preset scenario.

26. The device of claim 24, further comprising a positioning device coupled to the transceiver and the processor, wherein the positioning device comprises a GPS device, an indoor positioning sensor, or an environmental sensor, and wherein the transceiver is further configured to:
position, using the positioning device, third information about an actual position in which the device is located;
report, to a server, the third information to enable the server to query the distance between the device and the charging resource; and
receive the position information of the charging resource from the server, wherein the position information of the charging resource comprises the distance between the device and the charging resource, and wherein the processor is further configured to:

determine whether the distance between the device and the charging resource is less than a preset distance value; and determine that the energy availability level of the device is the first preset level in response to the distance being less than the preset distance value or the energy availability level of the device including a rechargeable-battery is the second preset level in response to the distance being not less than the preset distance value.

27. The device of claim 24, wherein the transceiver is further configured to receive the detection characteristic signal from the charging resource, and wherein the processor is further configured to:

determine whether a signal strength of the detection characteristic signal is greater than a preset signal strength; and determine that the energy availability level of the device is the first preset level in response to the signal strength being greater than the preset signal strength or that the energy availability level of the device is the second preset level in response to the signal strength not being greater than the preset signal strength.

* * * * *